US009154983B2

(12) United States Patent
Barriac et al.

(10) Patent No.: US 9,154,983 B2
(45) Date of Patent: Oct. 6, 2015

(54) SYSTEMS AND METHODS FOR DETECTING OR SIGNALING THE PRESENCE OF BURSTY INTERFERENCE ON WIRELESS NETWORKS

(71) Applicant: QUALCOMM Incorporated, San Diego, CA (US)

(72) Inventors: Gwendolyn Denise Barriac, Encinitas, CA (US); Hemanth Sampath, San Diego, CA (US); Santosh Paul Abraham, San Diego, CA (US); Rahul Tandra, San Diego, CA (US); Yan Zhou, San Diego, CA (US); Bin Tian, San Diego, CA (US); Sameer Vermani, San Diego, CA (US); Simone Merlin, San Diego, CA (US); Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/963,669

(22) Filed: Aug. 9, 2013

(65) Prior Publication Data

US 2014/0198872 A1 Jul. 17, 2014

Related U.S. Application Data

(60) Provisional application No. 61/752,403, filed on Jan. 14, 2013, provisional application No. 61/752,408, filed on Jan. 14, 2013.

(51) Int. Cl.
*H04B 15/00* (2006.01)
*H04W 24/08* (2009.01)
(Continued)

(52) U.S. Cl.
CPC ............. *H04W 24/08* (2013.01); *H04L 1/1621* (2013.01); *H04L 1/1829* (2013.01); *H04L 1/0002* (2013.01)

(58) Field of Classification Search
None
See application file for complete search history.

(56) References Cited

U.S. PATENT DOCUMENTS 5,144,642 A 9/1992 Weinberg et al.
6,374,096 B1 * 4/2002 Parr ........................... 455/226.1
(Continued)

FOREIGN PATENT DOCUMENTS

EP 1322058 A1 6/2003
GB 2474842 A 5/2011

OTHER PUBLICATIONS

Rayanchu S. et al., "Diagnosing Wireless Packet Losses in 802.11: Separating Collision from Weak Signal," INFOCOM 2008. The 27th Conference on Computer Communications. IEEE, Apr. 2008, pp. 735-743.
(Continued)

*Primary Examiner* — Adolf Dsouza
(74) *Attorney, Agent, or Firm* — Knobbe Marten Olson & Bear LLP

(57) ABSTRACT

Systems, methods, and devices detect and managing the presence of bursty interference on a wireless communication system. A method of detecting the presence of bursty interference on a wireless network includes receiving, at a wireless device, a message from a transmitting device. The method further includes determining whether the message includes errors caused by bursty interference. The method further includes suspending a channel tracking when bursty interference is detected. The method may further include reporting bursty interference to the transmitting device when bursty interference is detected.

23 Claims, 18 Drawing Sheets

(51) Int. Cl.
   *H04L 1/16* (2006.01)
   *H04L 1/18* (2006.01)
   *H04L 1/00* (2006.01)

(56) References Cited

U.S. PATENT DOCUMENTS

| | | | |
|---|---|---|---|
| 7,016,436 B1 | 3/2006 | Molnar | |
| 8,261,151 B2 | 9/2012 | Niu et al. | |
| 8,295,266 B2 | 10/2012 | Kwon et al. | |
| 8,411,806 B1 | 4/2013 | Lee et al. | |
| 2002/0044614 A1 | 4/2002 | Molnar et al. | |
| 2002/0075834 A1* | 6/2002 | Shah et al. | 370/337 |
| 2002/0093928 A1* | 7/2002 | LoGalbo et al. | 370/336 |
| 2006/0274866 A1* | 12/2006 | Chang | 375/346 |
| 2007/0198898 A1 | 8/2007 | Ysebaert et al. | |
| 2008/0101508 A1* | 5/2008 | Oh et al. | 375/344 |
| 2008/0225965 A1* | 9/2008 | Pi et al. | 375/260 |
| 2011/0075611 A1 | 3/2011 | Choi | |
| 2011/0087944 A1 | 4/2011 | Li et al. | |
| 2011/0286340 A1 | 11/2011 | Janecek et al. | |
| 2013/0260763 A1 | 10/2013 | Bhattad et al. | |

OTHER PUBLICATIONS

International Search Report and Written Opinion—PCT/US2014/011070—ISA/EPO—Mar. 4, 2014.
Mediatek, "Trigger of In-Device Coexistence Indication", 3GPP Draft, R2-115229 Trigger of IDC Indication, 3rd Generation Partnership Project (3GPP), Mobile Competence Centre, 650, Route Des Lucioles, F-06921 Sophia-Antipolis Cedex, France, vol. RAN WG2, No. Zhuhai, Oct. 4, 2011, pp. 4; XP050541003.

* cited by examiner

FIG. 13

MAC Header 1302: Frame Control (1310, 2) | Duration/ID (1325, 2) | Address 1 (1330, 6) | Address 2 (1335, 6) | Address 3 (1340, 6) | Sequence Control (1345, 2) | Address 4 (1350, 6) | QoS Control (1355, 2) | HT Control (1360, 4) | Frame Body (1365, 0-*) | FCS (1370, 4)

Octets shown below each field.

FIG. 14

1310: Protocol Version (1411, 2) | Type (1412, 2) | Subtype (1413, 4) | To DS (1414, 1) | From DS (1415, 1) | More Fragments (1416, 1) | Retry (1417, 1) | Power Management (1418, 1) | More Data (1419, 1) | Protected Frame (1420, 1) | Order (1421, 1)

Bits shown below each field.

FIG. 15

1500: MAC Header 1502: Frame Control (1510, 2) | Duration/ID (1525, 2) | BURSTY ERRORS INDICATION (1530, 6) | FCS (4)

Octets shown below each field.

SYSTEMS AND METHODS FOR DETECTING OR SIGNALING THE PRESENCE OF BURSTY INTERFERENCE ON WIRELESS NETWORKS

CROSS REFERENCE TO RELATED APPLICATIONS

This application claims the benefit of U.S. Provisional Application 61/752,403, filed Jan. 14, 2013, and entitled "SYSTEMS AND METHODS FOR SIGNALING THE PRESENCE OF BURSTY INTERFERENCE ON WIRELESS NETWORKS," and assigned to the assignee hereof. This application also claims the benefit of U.S. Provisional Application 61/752,408, filed Jan. 14, 2013, and entitled "SYSTEMS AND METHODS FOR DETECTING THE PRESENCE OF BURSTY INTERFERENCE ON WIRELESS NETWORKS," and assigned to the assignee hereof. The disclosures of these prior applications are considered part of this application, and are hereby incorporated by reference in their entirety.

BACKGROUND

1. Field

The present application relates generally to wireless communications, and more specifically to systems, methods, and devices for detecting and managing interference in wireless networks.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

When there are multiple users of a wireless network, to avoid collisions and loss of data, the network may provide a procedure for coordinating access to the wireless medium. In some instances, collisions may occur, causing interference among the various network devices. Improved methods and systems for reducing loss of data in a network with a large number of users are desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include providing wireless communication in sub-gigahertz bands for low power and long distance wireless communications.

One aspect of the disclosure provides an implementation of a method of signaling the presence of bursty interference on a wireless network. The method includes receiving a message from the wireless network, determining whether the received message includes errors caused by bursty interference, and transmitting a message indicating whether the received message included errors caused by bursty interference. In some aspects, the message is a block acknowledgement message. In some aspects, the message is a negative acknowledgement of a single MPDU. In some other aspects, a multicast receiver address field in the transmitted message indicates errors caused by bursty interference.

Another aspect disclosed is an apparatus for signaling the presence of bursty interference on a wireless network. The apparatus includes a receiver configured to receiving a message from the wireless network, a processor configured to determine whether the received message includes errors caused by bursty interference, and a transmitter configured to transmit a message indicating whether the received message included errors caused by bursty interference. In some aspects, the message is a block acknowledgement message. In some aspects, the message is a negative acknowledgement of a single MPDU. In some other aspects, a multicast receiver address field in the transmitted message indicates errors caused by bursty interference.

Another aspect disclosed is an apparatus for signaling the presence of bursty interference on a wireless network. The apparatus includes means for receiving a message from the wireless network, means for determining whether the received message includes errors caused by bursty interference, and means for transmitting a message indicating whether the received message included errors caused by bursty interference. In some aspects, the message is a block acknowledgement message. In some aspects, the message is a negative acknowledgement of a single MPDU. In some other aspects, a multicast receiver address field in the transmitted message indicates errors caused by bursty interference.

Another aspect disclosed is a computer readable storage medium including instructions that when executed by a processor cause it to perform a method of signaling the presence of bursty interference on a wireless network. The method includes receiving a message from the wireless network, determining whether the received message includes errors caused by bursty interference, and transmitting a message indicating whether the received message included errors caused by bursty interference. In some aspects, the message is a block acknowledgement message. In some aspects, the message is a negative acknowledgement of a single MPDU. In some other aspects, a multicast receiver address field in the transmitted message indicates errors caused by bursty interference.

Another aspect disclosed is a method of signaling the presence of bursty interference on a wireless network. The method includes transmitting a message on the wireless network, and receiving a message indicating whether reception of the transmitted message included errors caused by bursty interference. In some aspects, the received message is a block acknowledgement message. In some aspects, the received message is a negative acknowledgement of a single MPDU. In some other aspects, a multicast receiver address field in the received message indicates errors caused by bursty interference. Another aspect disclosed is an apparatus for signaling the presence of bursty interference on a wireless network. The apparatus includes a transmitter configured to transmit a message on the wireless network, and a receiver configured to receive a message indicating whether reception of the transmitted message included errors caused by bursty interference. In some aspects, the received message is a block acknowledgement message. In some aspects, the received message is a negative acknowledgement of a single MPDU. In some other aspects, a multicast receiver address field in the received message indicates errors caused by bursty interference.

Another aspect disclosed is an apparatus for signaling the presence of bursty interference on a wireless network. The apparatus includes means for transmitting a message on the wireless network, and means for receiving a message indicating whether reception of the transmitted message included errors caused by bursty interference. In some aspects, the received message is a block acknowledgement message. In some aspects, the received message is a negative acknowledgement of a single MPDU. In some other aspects, a multicast receiver address field in the received message indicates errors caused by bursty interference.

Another aspect disclosed is a computer readable storage medium including instructions that when executed by a processor cause it to perform a method of signaling the presence of bursty interference on a wireless network. The method includes transmitting a message on the wireless network, and receiving a message indicating whether reception of the transmitted message included errors caused by bursty interference. In some aspects, the received message is a block acknowledgement message. In some aspects, the received message is a negative acknowledgement of a single MPDU. In some other aspects, a multicast receiver address field in the received message indicates errors caused by bursty interference.

Another aspect disclosed is a method of indicating whether information on bursty interference is being signaled on a wireless communication network. The method includes receiving a message from the wireless network, and transmitting a message including a first indication. The first indication indicates whether the transmitted message includes a second indication. If present, the second indication indicates whether the received message included errors caused by bursty interference.

Another aspect disclosed is an apparatus for indicating whether information on bursty interference is being signaled on a wireless communication network. The apparatus includes a receiver configured to receive a message from the wireless network, and a transmitter configured to transmit a message including a first indication. The first indication indicates whether the transmitted message includes a second indication. If present, the second indication indicates whether the received message included errors caused by bursty interference.

Another aspect disclosed is an apparatus for indicating whether information regarding bursty interference is being signaled on a wireless communication network. The apparatus includes means for receiving a message from the wireless network, and means for transmitting a message including a first indication. The first indication indicates whether the transmitted message includes a second indication. If present, the second indication indicates whether the received message included errors caused by bursty interference.

Another aspect disclosed is a computer readable storage medium including instructions that when executed by a processor cause it to perform a method of indicating whether information on bursty interference is being signaled on a wireless communication network. The method includes receiving a message from the wireless network, and transmitting a message including a first indication. The first indication indicates whether the transmitted message includes a second indication. If present, the second indication indicates whether the received message included errors caused by bursty interference.

Another aspect disclosed is a method of indicating whether an indication of bursty interference is being signaled on a wireless communication network. The method includes transmitting a message on the wireless network; and receiving a message including a first indication. The first indication indicates whether the received message includes a second indication. If present, the second indication indicates whether reception of the transmitted message included errors caused by bursty interference.

Another aspect disclosed is an apparatus for indicating whether information on bursty interference is being signaled on a wireless communication network. The apparatus includes a receiver configured to receive a message from the wireless network, and a transmitter for transmitting a message including a first indication. The first indication indicates whether the transmitted message includes a second indication. If present, the second indication indicates whether the received message included errors caused by bursty interference.

Another aspect disclosed is an apparatus for indicating whether information on bursty interference is being signaled on a wireless communication network. The apparatus includes means for receiving a message from the wireless network, and means for transmitting a message including a first indication. The first indication indicates whether the transmitted message includes indication second indication. If present, the second indication indicates whether the received message included errors caused by bursty interference.

Another aspect disclosed is a computer readable storage medium including instructions that when executed by a processor cause it to perform a method of indicating whether information on bursty interference is being signaled on a wireless communication network. The method includes receiving a message from the wireless network, and transmitting a message including a first indication. The first indication indicates whether the transmitted message includes a second indication. If present, the second indication indicates whether the received message included errors caused by bursty interference.

Another aspect disclosed is a method of detecting the presence of bursty interference on a wireless network. The method includes receiving, at a wireless device, a message from a transmitting device, determining whether the message includes errors caused by bursty interference, and modifying a characteristic of the wireless device based on said determining. In some aspects, the determining includes tracking phase and/or frequency offsets for a pilot channel, applying corrections to a data channel based on the tracked phase and/or frequency offsets, and detecting bursty interference based on the tracked phase and/or frequency offsets. In some aspects, detecting bursty interference based on the tracked phase and/or frequency offsets includes comparing at least one offset to a threshold offset. In some aspects, said determining includes tracking error and strength metrics for the message; and detecting bursty interference based on the error and strength metrics. In some aspects, detecting bursty interference based on the error and strength metrics includes calculating a ratio between the error and strength metrics and comparing the ratio to a threshold. In some aspects, the error metric includes a receive error vector magnitude (EVM) and the strength metric includes a received signal strength indicator (RSSI)

minus a noise floor. In some aspects, determining includes decoding the message, remodulating the decoded message, canceling the remodulated message from the original received message, and performing packet detection on a residual signal resulting from the cancelation.

In some aspects, packet detection includes one or more of preamble detection and guard interval detection. In some aspects, said modifying a characteristic of the wireless device includes reporting bursty interference to the transmitting device when bursty interference is detected. In some aspects, said modifying a characteristic of the wireless device includes suspending a channel tracking when bursty interference is detected.

Another aspect disclosed is a wireless device configured to detect the presence of bursty interference on a wireless network. The wireless device includes a receiver configured to receive a message from a transmitting device; and a processor configured to: determine whether the message includes errors caused by bursty interference; and modify a characteristic of the wireless device based on said determining.

In some aspects, said determining includes tracking phase and/or frequency offsets for a pilot channel, applying corrections to a data channel based on the tracked phase and/or frequency offsets, and detecting bursty interference based on the tracked phase and/or frequency offsets. In some aspects, said detecting bursty interference based on the tracked phase and/or frequency offsets includes comparing at least one offset to a threshold offset. In some aspects, said determining includes tracking error and strength metrics for the message, and detecting bursty interference based on the error and strength metrics.

In some aspects, detecting bursty interference based on the error and strength metrics includes calculating a ratio between the error and strength metrics and comparing the ratio to a threshold. In some aspects, the error metric includes a receive error vector magnitude (EVM) and the strength metric includes a received signal strength indicator (RSSI) minus a noise floor. In some aspects, said determining includes decoding the message, remodulating the decoded message, canceling the remodulated message from the original received message, and performing packet detection on a residual signal resulting from the cancelation. In some aspects, packet detection includes one or more of preamble detection and guard interval detection. In some aspects, said modifying a characteristic of the wireless device includes reporting bursty interference to the transmitting device when bursty interference is detected. In some aspects, said modifying a characteristic of the wireless device includes suspending a channel tracking when bursty interference is detected.

Another aspect disclosed is an apparatus for detecting the presence of bursty interference on a wireless network. The apparatus includes means for receiving a message from a transmitting device, means for determining whether the message includes errors caused by bursty interference; and means for modifying a characteristic of the apparatus based on said determining. In some aspects, said means for determining includes means for tracking phase and/or frequency offsets for a pilot channel, means for applying corrections to a data channel based on the tracked phase and/or frequency offsets; and means for detecting bursty interference based on the tracked phase and/or frequency offsets.

In some aspects, said means for detecting bursty interference based on the tracked phase and/or frequency offsets includes means for comparing at least one offset to a threshold offset. In some aspects, said means for determining includes means for tracking error and strength metrics for the message; and means for detecting bursty interference based on the error and strength metrics.

In some aspects, means for detecting bursty interference based on the error and strength metrics includes means for calculating a ratio between the error and strength metrics and comparing the ratio to a threshold. In some aspects, the error metric includes a receive error vector magnitude (EVM) and the strength metric includes a received signal strength indicator (RSSI) minus a noise floor.

In some aspects, said means for determining includes means for decoding the message; means for remodulating the decoded message; means for canceling the remodulated message from the original received message; and means for performing packet detection on a residual signal resulting from the cancelation.

In some aspects, packet detection includes one or more of preamble detection and guard interval detection. In some aspects, said means for modifying a characteristic of the apparatus includes means for reporting bursty interference to the transmitting device when bursty interference is detected. In some aspects, said means for modifying a characteristic of the apparatus includes means for suspending a channel tracking when bursty interference is detected.

Another aspect disclosed is a non-transitory computer-readable medium comprising code that, when executed, causes an apparatus to: receive a message from a transmitting device; determine whether the message includes errors caused by bursty interference on a wireless network; and modify a characteristic of the apparatus based on said determining. In some aspects, said determining includes tracking phase and/or frequency offsets for a pilot channel; applying corrections to a data channel based on the tracked phase and/or frequency offsets; and detecting bursty interference based on the tracked phase and/or frequency offsets. In some aspects, said detecting bursty interference based on the tracked phase and/or frequency offsets includes comparing at least one offset to a threshold offset. In some aspects, said determining includes tracking error and strength metrics for the message; and detecting bursty interference based on the error and strength metrics. In some aspects, detecting bursty interference based on the error and strength metrics includes calculating a ratio between the error and strength metrics and comparing the ratio to a threshold. In some aspects, the error metric includes a receive error vector magnitude (EVM) and the strength metric includes a received signal strength indicator (RSSI) minus a noise floor.

In some aspects, said determining includes decoding the message, remodulating the decoded message, canceling the remodulated message from the original received message; and performing packet detection on a residual signal resulting from the cancelation. In some aspects, packet detection includes one or more of preamble detection and guard interval detection. In some aspects, said modifying a characteristic of the apparatus includes reporting bursty interference to the transmitting device when bursty interference is detected. In some aspects, said modifying a characteristic of the apparatus includes suspending a channel tracking when bursty interference is detected.

BRIEF DESCRIPTION OF THE DRAWINGS

FIG. 13 shows an exemplary structure of a media access control (MAC) frame.

FIG. 14 shows an exemplary structure of a frame control field of the MAC header shown in FIG. 13.

FIG. 15 shows an exemplary structure of a media access control (MAC) frame.

DETAILED DESCRIPTION

Figure 1A:
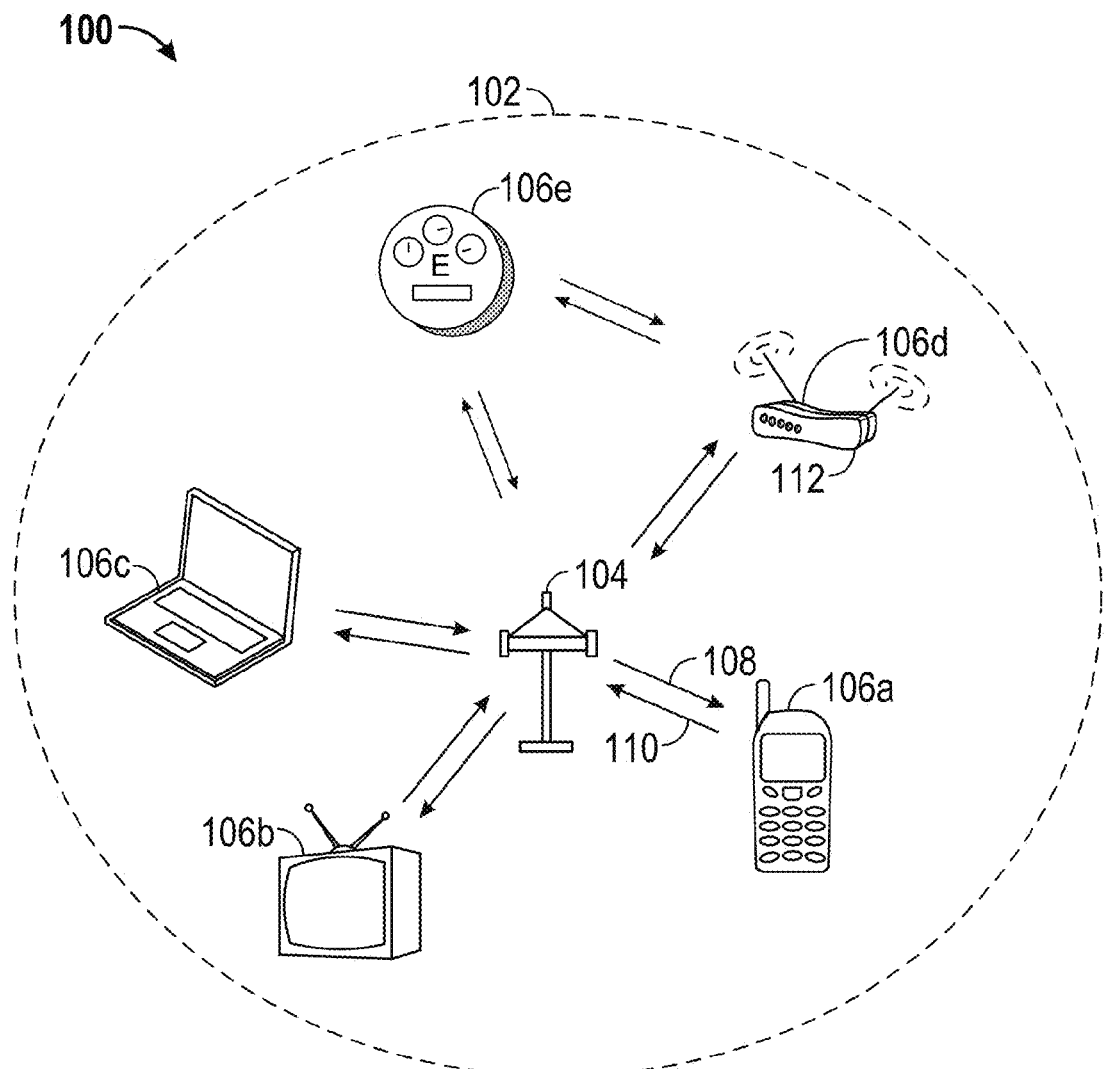
FIG. 1A illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes.

Certain of the devices described herein may further implement Multiple Input Multiple Output (MIMO) technology and be implemented as part of an 802.11 protocol. A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels or streams, where $N_S \leq \min\{N_T, N_R\}$. Each of the NS independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi_33 (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1A illustrates an example of a wireless communication system 100 in which aspects of the present disclosure may be employed. The wireless communication system 100 may operate pursuant to a wireless standard, for example the 802.11 standard. The wireless communication system 100 may include an AP 104, which communicates with STAs 106a, 106b, 106c, 106d, and 106e (collectively STAs 106).

STA 106e may have difficulty communicating with the AP 104 or may be out of range and unable to communicate with the AP 104. As such, another STA 106d may be configured as a relay 112 that relays communications between the STA 106e and the AP 104.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Access point 104a may communicate with station 106b during either a contention period or a contention free period within the wireless communication system 100. During a contention period for wireless communication system 100, transmissions between station 106b and access point 104a may collide with transmissions from other wireless stations within communications system 100. Depending on the utilization of wireless communication system 100, the collision rate may vary. When the wireless communication system 100 is under relatively heavy utilization, the percent of transmissions that experience one or more collisions may be relatively higher than when the wireless communication system 100 is less heavily utilized. Collisions experienced during heavy utilization of wireless communication system 100 may prevent reception of data by wireless nodes of wireless communication system 100. Some packets experiencing collisions may not be acknowledged by the intended receiver. Alternatively, block acknowledgements may be transmitted from a receiver to a transmitter, indicating a reception status for each of a plurality of packets.

The transmission of some wireless messages may fail due to reasons other than collisions. For example, the physical distance between a STA 106 and an AP 104 may be large relative to the transmission power of either the STA 106 or AP 104. When a transmitted signal is received at a receiver, it may be too weak to be properly decoded. This type of transmission error is known in the art as fading. Packets experiencing fading may not be acknowledged by the intended receiver. Alternatively, block acknowledgments may be transmitted by a receiver to an original transmitter, indicating a reception status for each of a plurality of packets.

In response to unsuccessful transmission of one or more packets, a transmitter may adjust transmission parameters in an attempt to improve communication with the receiver. For example, the transmitter may lower the Modulation and Coding Scheme (MCS) and lengthen the packet duration. If the transmission problems are due to fading, this may improve an ability of a receiver that is receiving a weak transmission signal to decode a wireless message transmitted with the lower MCS. If the transmission problems are due to collisions, lengthening the transmission time of a wireless message may exacerbate transmission issues on a heavily utilized network, since longer packets are more susceptible to being interrupted by a collision.

Figure 1B:
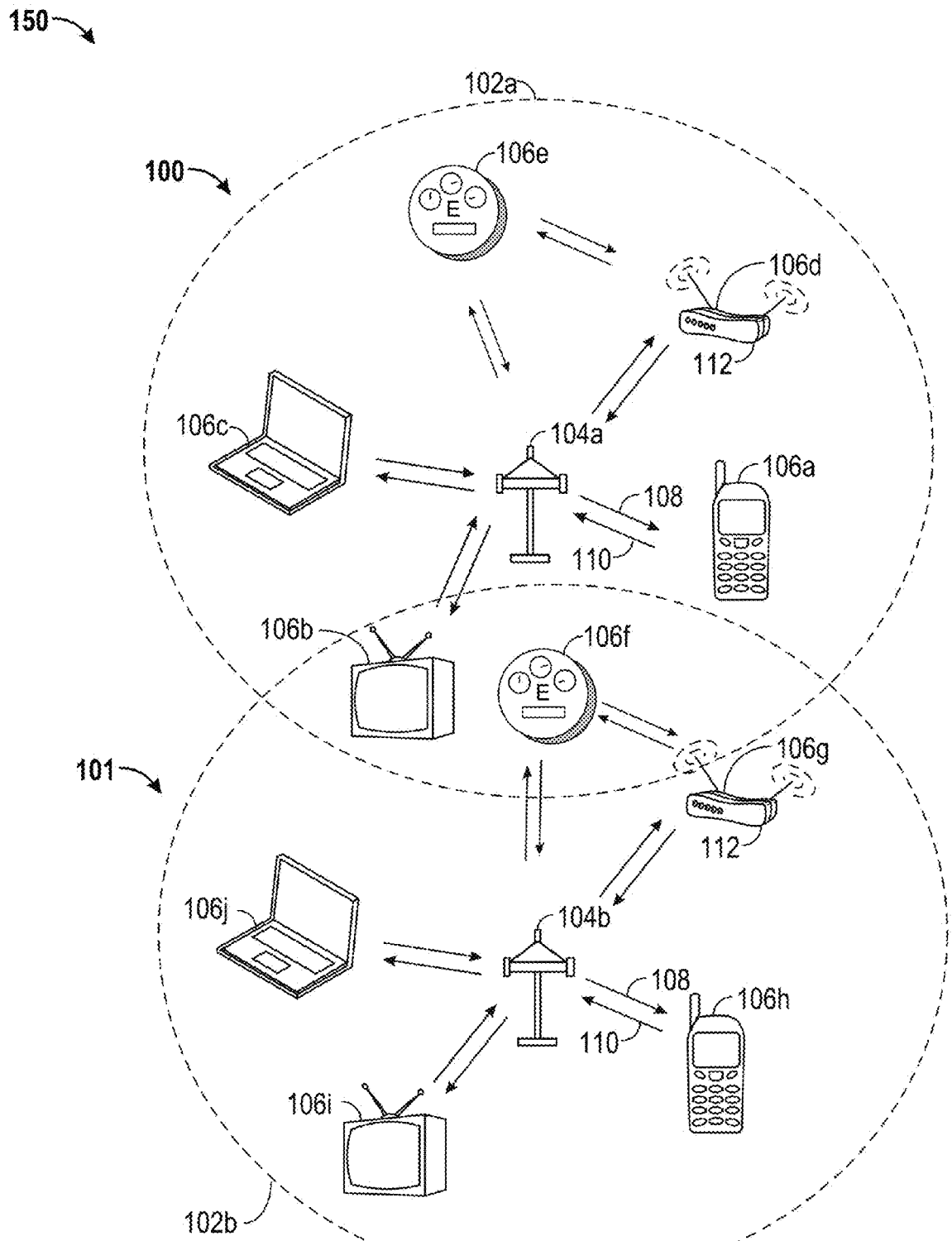
FIG. 1B illustrates an example of a wireless communication system in which aspects of the present disclosure may be employed.

FIG. 1B illustrates an example of a wireless communication system 150 in which aspects of the present disclosure may be employed. The wireless communication system 500 may operate pursuant to a wireless standard, for example the 802.11 standard. Wireless communication system 500 includes the wireless communication system 100 illustrated in FIG. 1A, as well as a second wireless communications system 101. The wireless communication system 150 includes APs 104a-104b, which communicate with STAs 106a-106e within wireless communication system 100 and STAs 106f-106j respectively within wireless communication system 101 (collectively STAs 106).

Station 106b is associated with and communicates with AP 104a, but is also within the transmission range of access point 104b. Station 106f is associated with and communicates with AP 104b, but is also within the transmission range of access point 104a.

As discussed above, stations may communicate with an access point during either a contention period or during a contention free period. During a contention free period of wireless communication system 100, collisions will generally not occur with other transmissions from devices of communications system 100. However, since station 106b is within the transmission range of AP 104b, it may experience packet collisions during a contention free period due to transmissions from wireless communications system 150. Depending on the utilization of the communication system 101, the frequency of transmissions by AP 104b may vary. If wireless communication system 101 is heavily utilized, station 106b may experience collisions resulting from transmissions of AP 104b, even during a contention free period of wireless communication system 100.

As discussed above, in response to packet losses, AP 104a may adjust its transmission parameters. However, as also discussed above, such adjustments may in some cases increase the probability of additional collisions. For example, if a packet transmitted during a contention free period between AP 104a and STA 106b collides with a transmission from AP 104b, AP 104a may assume the transmission failed due to fading, and lower the MCS and length the transmission time of the packet. This may increase the probability that a retransmission of the packet also collides with a transmission from AP 104b, especially if the wireless communication system 101 is heavily utilized. Therefore, improved methods and apparatus for detecting and reporting packet collisions in a wireless communication system are desired.

Some aspects disclosed herein improve communication on a wireless network experiencing transmission errors due to collisions or other forms of bursty interference by communicating from a wireless message receiver to a wireless message transmitter the nature of errors experienced when a wireless message is received by the receiver. In various embodiments, bursty interference can refer to transient active interference, as opposed to, for example, fading caused by passive properties of a propagation path. In some aspects, a receiver of a wireless message may determine whether packet errors are the result of interference. The receiver may then transmit a message back to the transmitter of the received message indicating whether the reception of the message included errors caused by bursty interference. A transmitter receiving such an indication may improve the adaptation of transmission parameters in response to the indication, when compared to adapting transmission parameters based only on knowledge that a packet was not correctly received. For example, when packet errors are due to bursty interference, a transmitter may not lower the MCS and not increase the length of packet transmissions, as this may exacerbate transmission problems in a heavily utilized wireless network or wireless medium.

Figure 2:
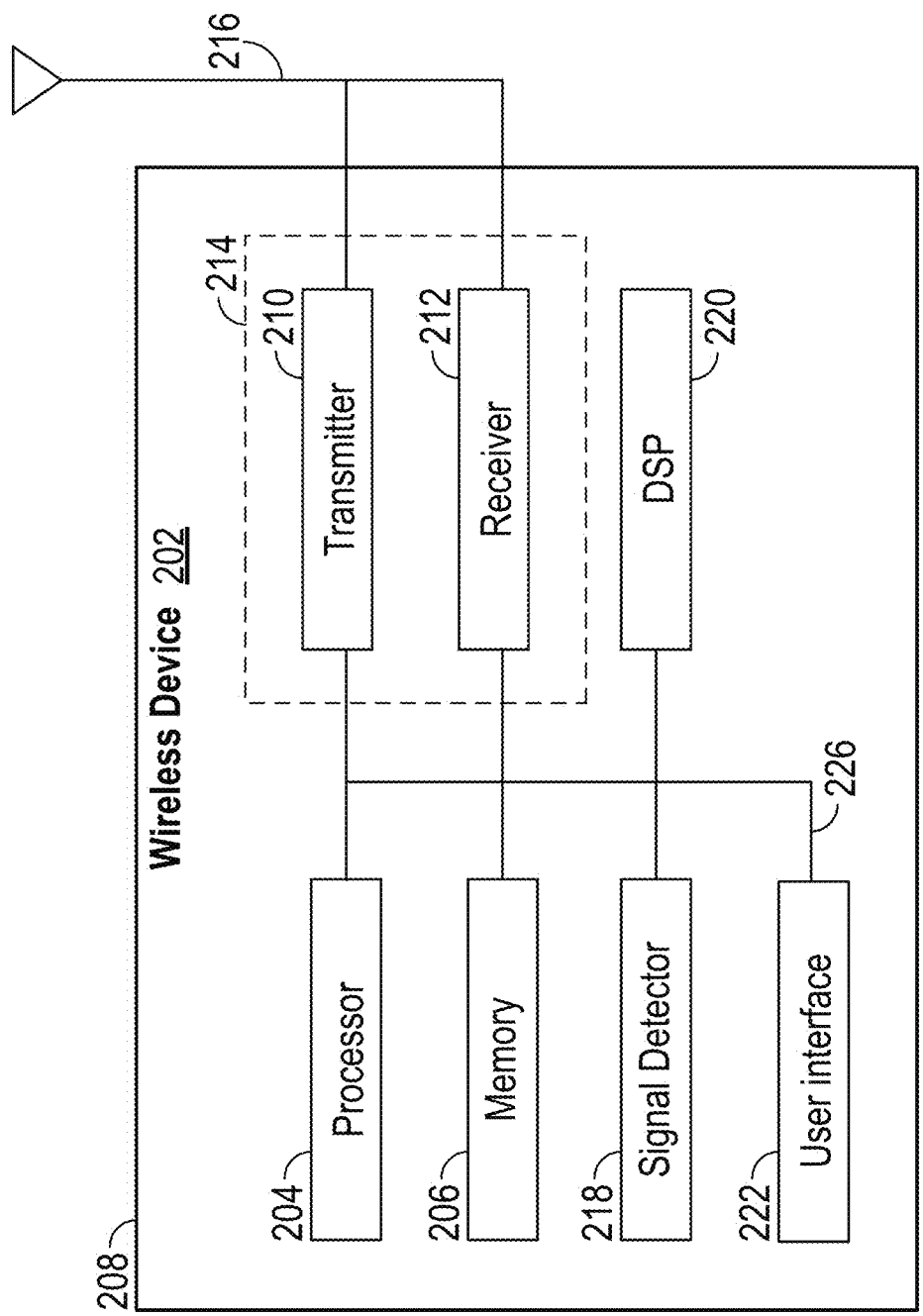
FIG. 2 shows a functional block diagram of an exemplary wireless device that may be employed within the wireless communication system of FIG. 1A or FIG. 1B.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104, a relay 112, or one of the STAs 106 of FIG. 1A or FIG. 1B.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some aspects, the receiver 212 is configured to detect a type of a MAC header used and process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive communications having a plurality of MAC header types.

Figure 3:
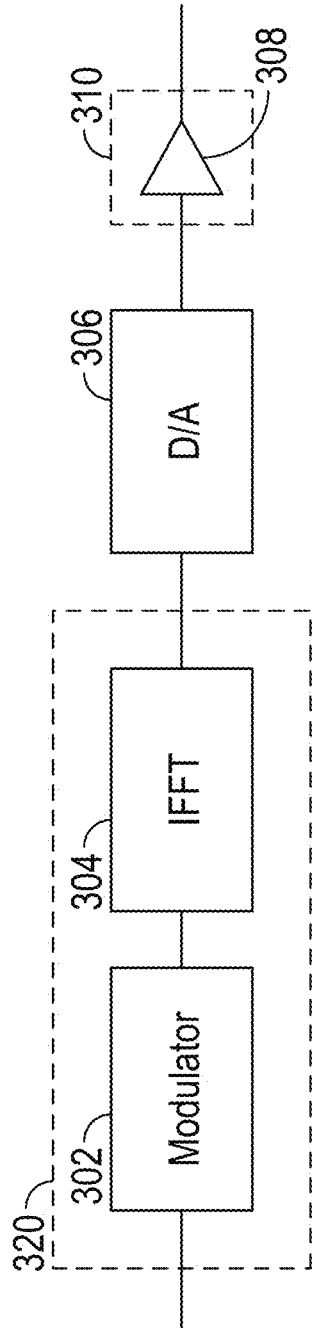
FIG. 3 shows a functional block diagram of exemplary components that may be utilized in the wireless device of FIG. 2 to transmit wireless communications.

As discussed above, the wireless device 202 may comprise an AP 104 or an STA 106, and may be used to transmit and/or receive communications. FIG. 3 illustrates various components that may be utilized in the wireless device 202t to transmit wireless communications. The components illustrated in FIG. 3 may be used, for example, to transmit OFDM communications. In some aspects, the components illustrated in FIG. 3 are used to generate and transmit packets to be sent over a bandwidth of less than or equal to 1 MHz.

The wireless device 202t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202t (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 202b may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being unconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

Figure 4:
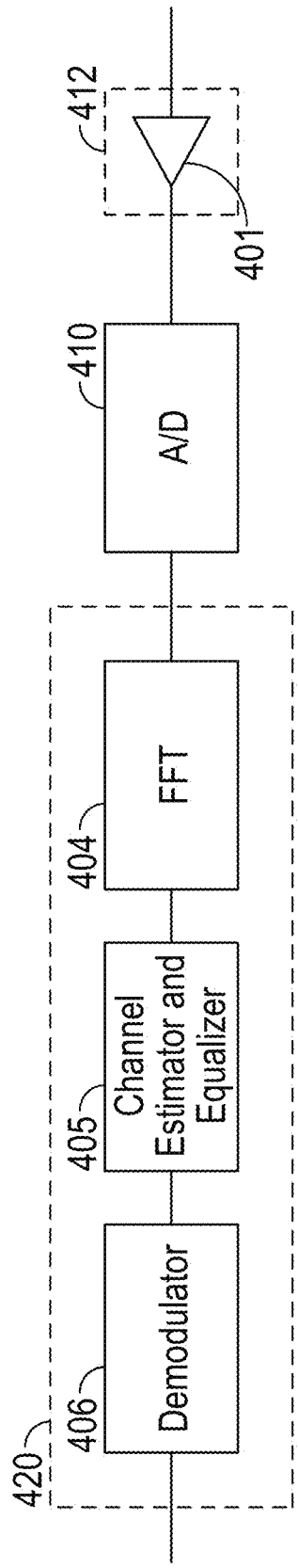
FIG. 4 shows a functional block diagram of exemplary components that may be utilized in the wireless device of FIG. 2 to receive wireless communications.

FIG. 4 illustrates various components that may be utilized in the wireless device 202 of FIG. 2 to receive wireless communications. The components illustrated in FIG. 4 may be used, for example, to receive OFDM communications. For example, the components illustrated in FIG. 4 may be used to receive data units transmitted by the components discussed above with respect to FIG. 3.

The receiver 412 of wireless device 202b is configured to receive one or more packets or data units in a wireless signal. Data units that may be received and decoded or otherwise processed as discussed below.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202r may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 202r. In some aspects, the analog to digital converter 410 is implemented in the transceiver 214 (FIG. 2) or in a data receive processor.

The wireless device 202r may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. The number of points used by the transform module 404 may be referred to as the size of the transform module 404. In some aspects, the transform module 404 may identify a symbol for each point that it uses.

The wireless device 202b may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 202t may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 202a shown in FIG. 3 shows an example of a single transmit chain to be transmitted over an antenna. The wireless device 202b shown in FIG. 4 shows an example of a single receive chain to be received over an antenna. In some implementations, the wireless device 202a or 202b may implement a portion of a MIMO system using multiple antennas to simultaneously transmit data.

Figure 5A:
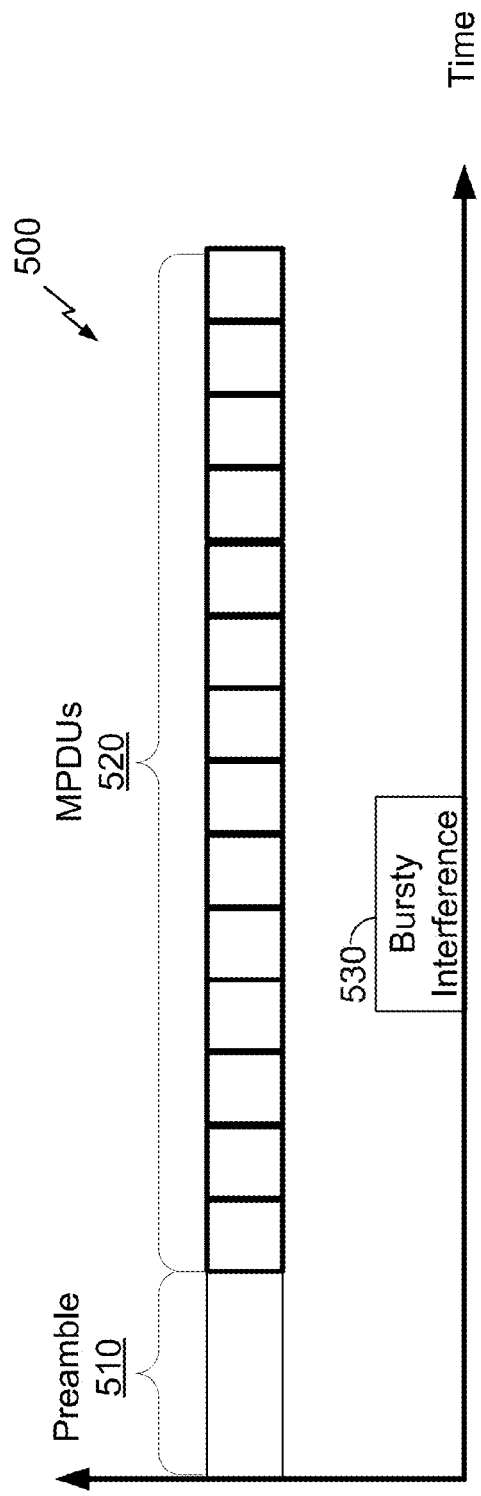
FIG. 5A shows an exemplary packet transmission with collision in the wireless network of FIG. 1B.

FIG. 5A shows an exemplary packet transmission 500 with collision in the wireless network 150 of FIG. 1B. As described above, devices in the wireless network 150 can cause collisions when they transmit at the same time. For example, the AP 104b can transmit a preamble 510 and a plurality of media access control protocol data units (MPDUs) 520 to the STA 106g. While the AP 104b transmits the MPDUs 520, another device, such as the STA 106f can transmit bursty interference 530. In some embodiments, the bursty interference 530 can cause one or more MPDUs 520 to fail, as shown in FIG. 5B.

Figure 5B:
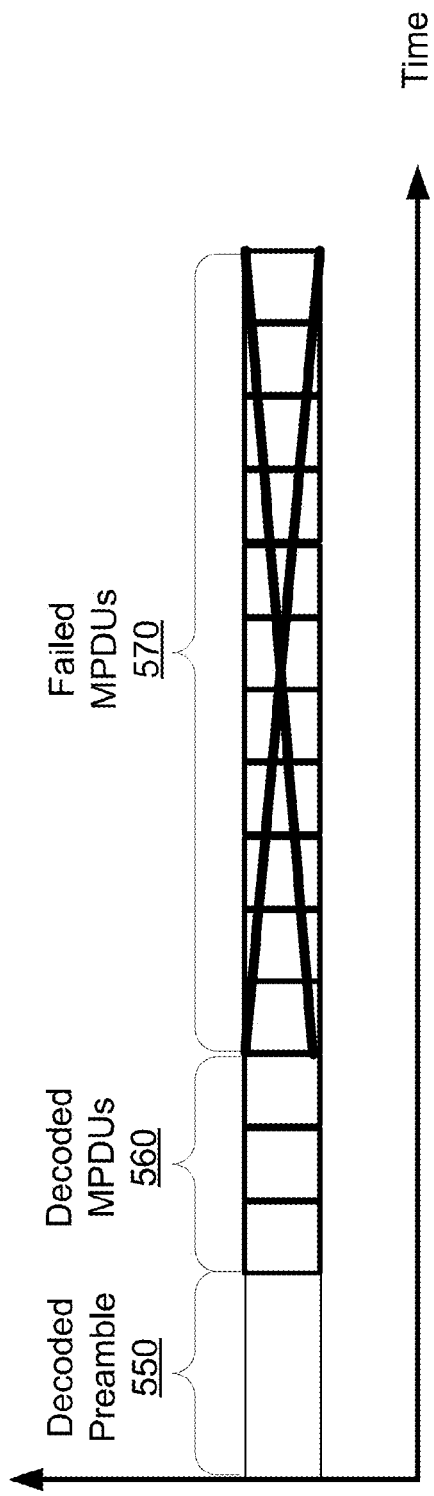
FIG. 5B shows an exemplary packet reception in the wireless network of FIG. 1B.

FIG. 5B shows an exemplary packet reception in the wireless network 150 of FIG. 1B. For example, the STA 106g can receive the preamble 510a and generate a decoded preamble 550. The STA 106g can further receive the MPDUs 520 and generate decoded MPDUs 560. The STA 106g may be able to decode the MPDUs 520 received before the bursty interference 530. MPDUs 520 received during the bursty interference 530 can fail, resulting in one or more failed MPDUs 570. Moreover, MPDUs 520 received after the bursty interference 530 can also fail. For example, the STA 106g may track a channel using pilot tones in each OFDM symbol. The STA 106g can estimate a phase offset, which can indicate the change in phase in the channel. The STA 106g can calculate a frequency offset based on the received signal and the pilot tones.

Under normal conditions, the STA 106g can use the phase offset and/or frequency offset to correct the received data tones in a phase tracking loop. In some embodiments, the phase tracking loop can be state dependent. During bursty interference 530, the determined phase offsets and/or frequency offsets can be distorted. Accordingly, the STA 106g may apply incorrect modifications to the received data. Moreover, the phase tracking loop can enter an incorrect state, causing subsequent MPDUs 570 to receive improper modifications, even after the bursty interference 530 is finished.

In some embodiments, the STA 106g can detect the bursty interference 530, and modify a characteristic of the STA 106g. For example, the STA 106g can suspend the tracking loop during the bursty interference 530. In an embodiment, the STA 106g can notify the transmitter AP 104b of the bursty interference 530. In various embodiments, the STA 106g can detect the bursty interference 530 using one or more methods described herein, alone or in combination, in addition to other methods that may be known in the art.

Figure 6A:
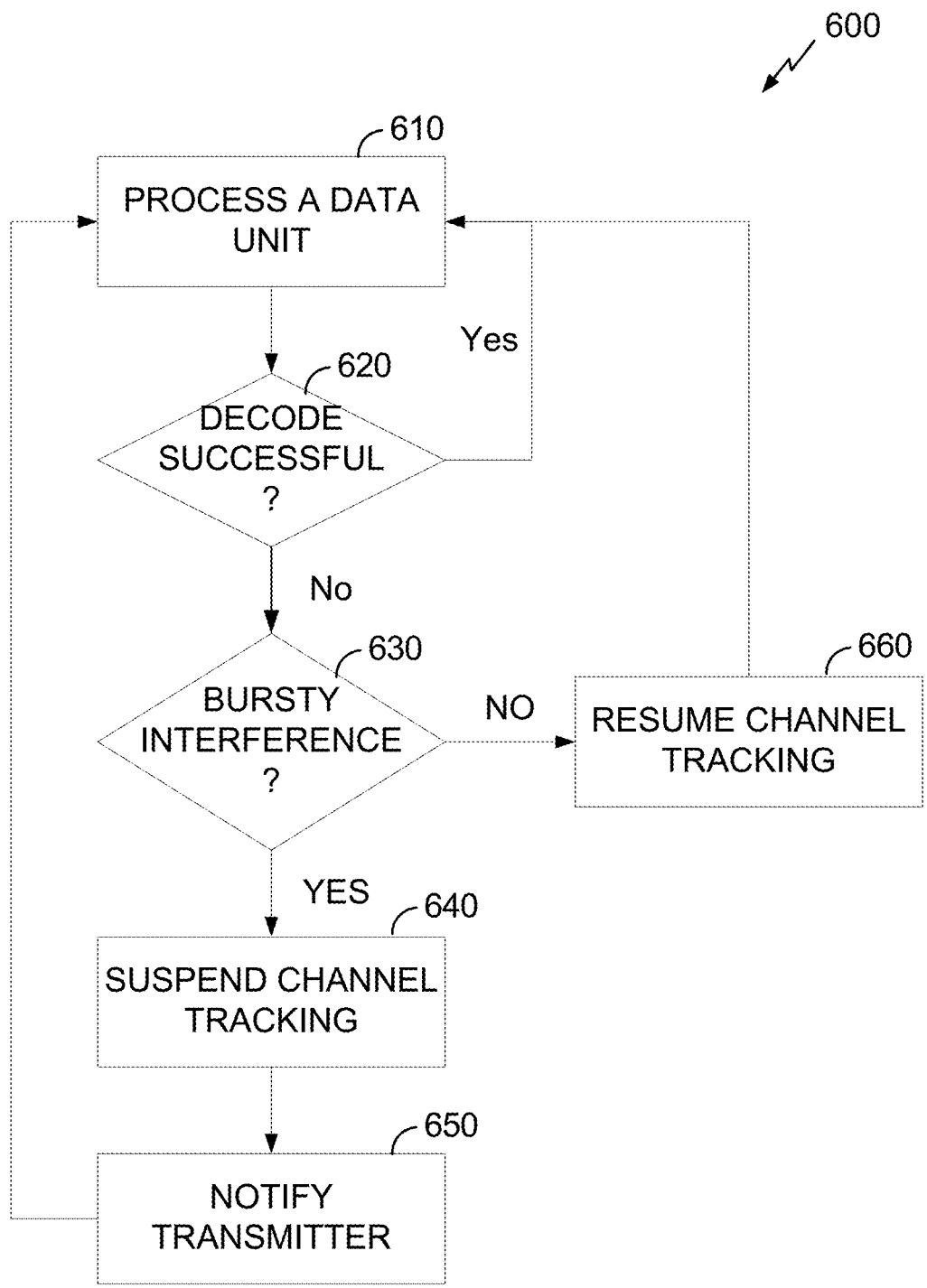
FIG. 6A is a flowchart for an exemplary method of detecting and managing interference in the wireless network of FIG. 1B.

FIG. 6A is a flowchart 600 for an exemplary method of detecting and managing interference in the wireless network 150 of FIG. 1B. The method can be implemented in whole or in part by the devices described herein, such as the wireless device 202 shown in FIG. 2. Although the illustrated method is described herein with reference to the wireless communication system 150 discussed above with respect to FIG. 1B, and the wireless device 202 discussed above with respect to FIG. 2, and the data transmission 500 discussed above with respect to FIGS. 5A-5B, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

At block 610, the wireless device 202 processes a data unit. For example, the STA 106g can receive one of the MPDUs 520. The data unit may or may not be received during the bursty interference 530.

At block 620, the wireless device 202 determines whether the data unit is successfully decoded. For example, the STA 106g can attempt to decode the MPDU 520. If the decoding succeeds, then the wireless device 202 proceeds to continue decoding the rest of the data units at block 610. If the decoding fails (for example, if a frame check fails), the wireless device 202 proceeds to block 630.

At block 630, the wireless device 202 determines whether the data unit failed due to bursty interference. In various embodiments, the wireless device 202 can use one or more of the methods to determine bursty interferences such as, for example, the methods described herein with respect to FIGS. 7-9 and any other methods known in the art.

The wireless device 202 can use a single method alone or a plurality of methods in combination. For example, the wireless device 202 can apply a heuristic to the outcomes of a plurality of bursty interference detection methods. In an embodiment, the wireless device 202 can determine that bursty interference is present when, for example, two separate detection methods independently indicate that bursty interference is present.

At block 640, if the wireless device 202 determines that bursty interference is present, the wireless device 202 can suspend channel tracking. For example, the wireless device 202 can stop determining and/or calculating a phase and/or frequency offset. The wireless device 202 can stop applying corrections based on the phase and/or frequency offset. In various embodiments, the wireless device 202 can otherwise freeze, suspend, or terminate the pilot tracking loop.

At block 650, the wireless device 202 can notify a transmitting device, from which the data unit was received, that the data unit failed due to bursty interference. The wireless device 202 can provide any indication of bursty interference. For example, the STA 106g can transmit a message to the AP 104b indicating that one or more MPDUs 520 failed due to bursty interference.

At block 660, if the wireless device 202 determines that bursty interference is not present at block 630, the wireless device 202 can resume channel tracking. If channel tracking was not previously suspended, the wireless device 202 may take no further action regarding channel tracking. The wireless device 202 can then proceed to process the next data unit at block 610.

Figure 6B:
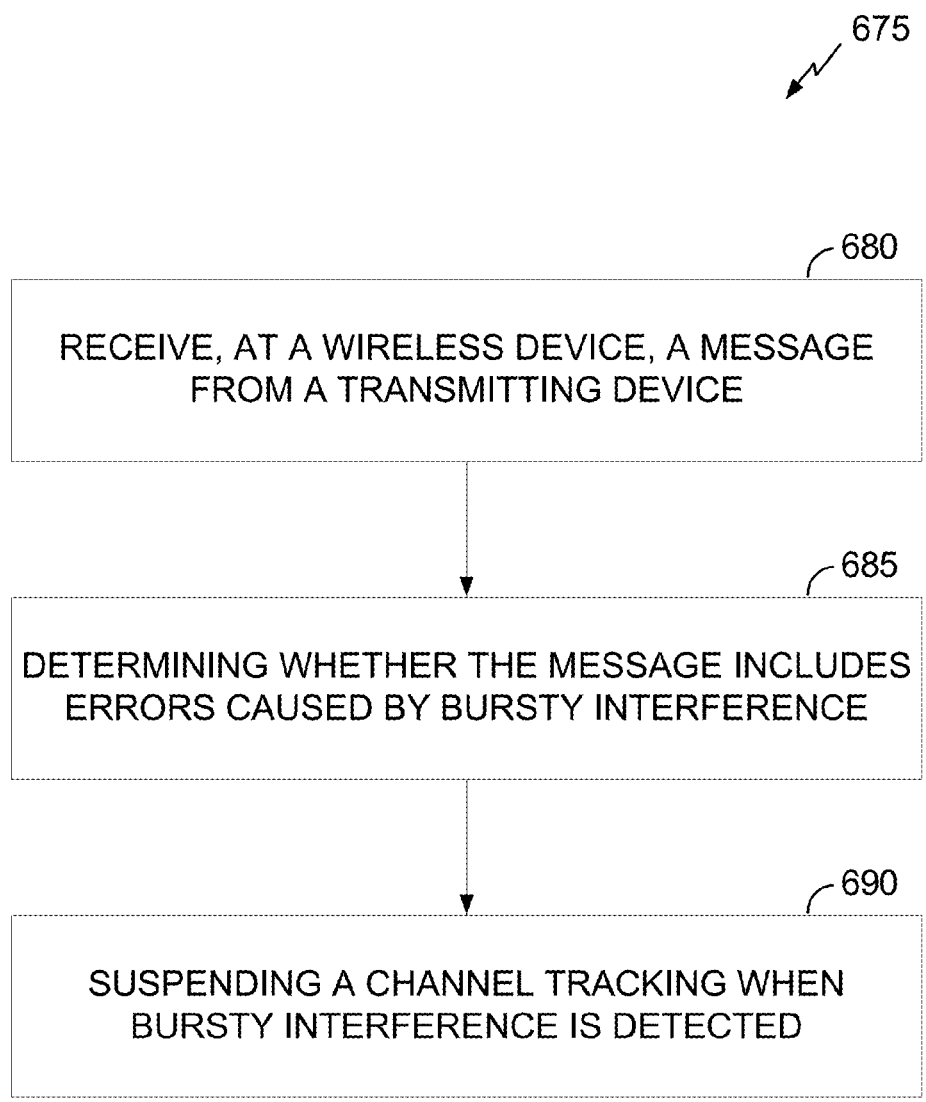
FIG. 6B is a flowchart for an exemplary method of detecting the presence of bursty interference on the wireless network of FIG. 1B.

FIG. 6B is a flowchart for an exemplary method of detecting the presence of bursty interference on the wireless network of FIG. 1B. In some aspects, process 675 may be performed by wireless device 202, illustrated in FIG. 2. In some aspects, process 675 may be performed by a station. In some aspects, process 675 may be performed by an access point. In some aspects, process 675 may be performed by a relay. In block 680, a message is received at a wireless device, the message being transmitted from a transmitting device. In block 685, the receiving wireless device determines whether the message includes errors caused by bursty interference. In various aspects, block 685 may utilize one or more of the processes 600, 700, 800, or 900 discussed with respect to FIG. 6A, 7, 8, or 9 respectively, to detect whether the message includes errors caused by bursty interference.

In block 690, if bursty interference is detected, channel tracking is suspended. For example, the wireless device 202 can stop determining and/or calculating a phase and/or frequency offset. The wireless device 202 can stop applying corrections based on the phase and/or frequency offset. In various embodiments, the wireless device 202 can otherwise freeze, suspend, or terminate the pilot tracking loop.

Figure 7:
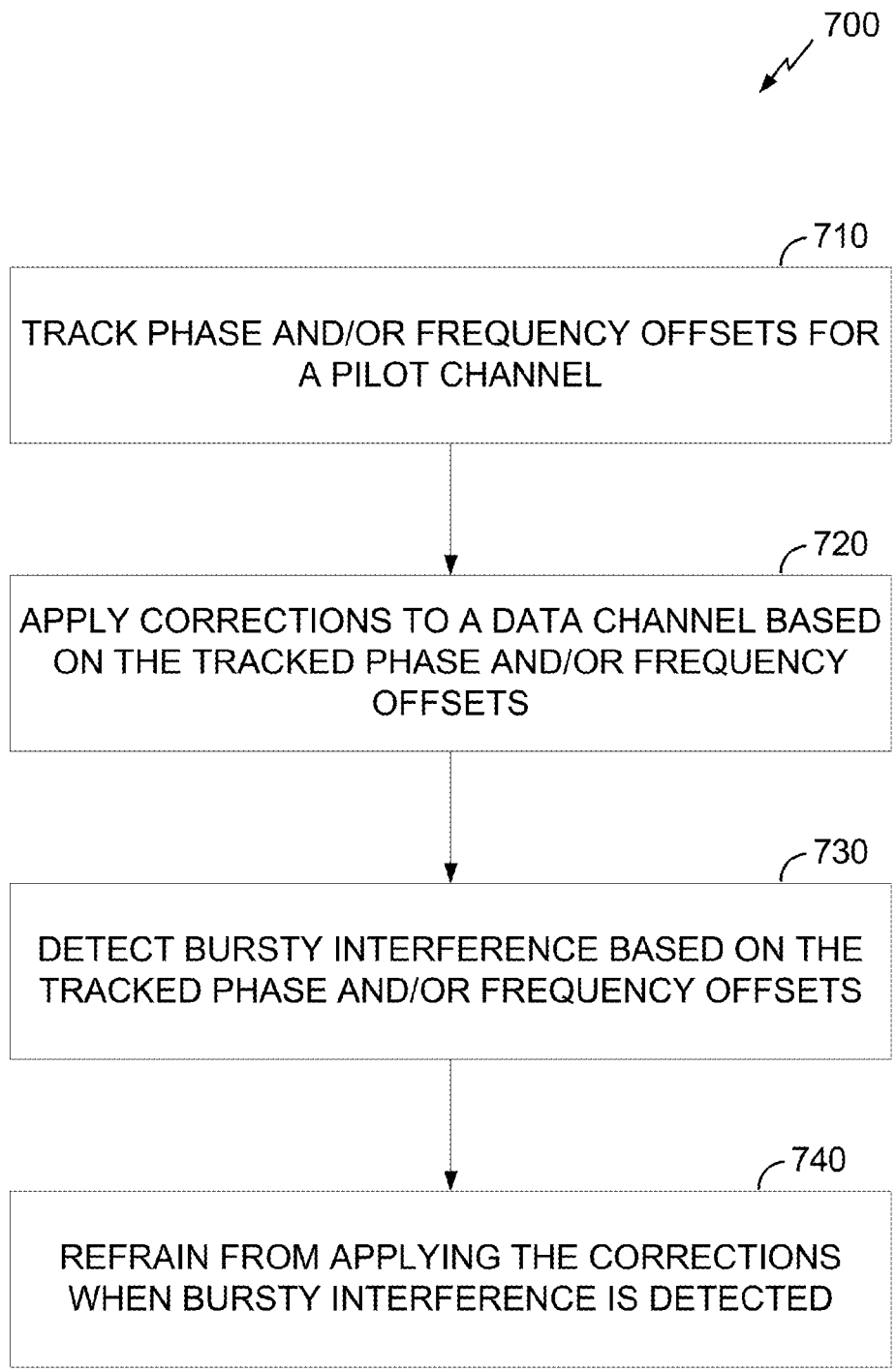
FIG. 7 is a flowchart for another exemplary method of detecting and managing interference in the wireless network of FIG. 1B.

FIG. 7 is a flowchart 700 for another exemplary method of detecting and managing interference in the wireless network 150 of FIG. 1B. In various embodiments, the wireless device 202 (FIG. 2) can use the method of flowchart 700, alone or in combination with other methods, to determine bursty interference at block 630 of FIG. 6A. The method can be implemented in whole or in part by the devices described herein, such as the wireless device 202 shown in FIG. 2. Although the illustrated method is described herein with reference to the wireless communication system 150 discussed above with respect to FIG. 1B, and the wireless device 202 discussed above with respect to FIG. 2, and the data transmission 500 discussed above with respect to FIGS. 5A-5B, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

At block 710, the wireless device 202 tracks a phase and/or frequency offset for a pilot channel. For example, the STA 106g can estimate a phase offset indicating a change in phase based on pilot tones in ODFM signals received from the AP 104b. The STA 106g can also calculate a frequency offset based on the received signal and/or pilot tones.

At block 720, the wireless device 202 applies corrections to a data channel based on the tracked phase and/or frequency offsets. For example, the STA 106g can apply corrections to the data channel calculated to cancel the offsets tracked at block 710, above. Because signal propagation may be similar for the pilot tones and data, the offsets determined for the known pilot tones can be applied to the data.

At block 730, the wireless device 202 detects bursty interference based on the tracked phase and/or frequency offsets. In some embodiments, bursty interference can cause the offsets to be much higher than normal. Accordingly, the STA 106g can compare the frequency offset to a threshold that indicates bursty interference. For example, the STA 106g can determine that bursty interference is present when the frequency offset is greater than 1 kHz. In an embodiment, the STA 106g can compare the phase offset to a threshold that indicates bursty interference.

The thresholds can be predetermined (for example, stored in the memory 206) and/or dynamically determined. For example, the wireless device 202 can maintain a history of phase and/or frequency offsets and can compare the most recent offsets to a statistical metric of historical offsets. In an embodiment, the wireless device 202 can determine that burst interference is present when the most recent offset is greater than one standard deviation above the mean of historical offsets. Likewise, the wireless device 202 can determine that bursty interference is not present when the most recent offsets are below the predetermined and/or dynamically determined thresholds.

At block 740, the wireless device 202 refrains from applying the data corrections when it detects bursty interference. In some embodiments, the wireless device 202 can suspend a channel tracking loop while it detects bursty interference. The wireless device 202 can resume data corrections and/or channel tracking when it detects that bursty interference is not present. For example, the wireless device 202 can resume data corrections when the frequency offset is less than 1 kHz.

In an embodiment, the method shown in FIG. 7 can be implemented in a wireless device that can include a tracking circuit, an applying circuit, a detecting circuit, and a refraining circuit. Those skilled in the art will appreciate that a wireless device may have more components than the simplified wireless device described herein. The wireless device described herein includes only those components useful for describing some prominent features of implementations within the scope of the claims.

The tracking circuit can be configured to track phase and/or frequency offsets for the pilot channel. The tracking circuit may be configured to perform one or more of the functions discussed above with respect to block 710. The tracking circuit can include one or more of the processor 204 (FIG. 2), the memory 206 (FIG. 2), the DSP 220 (FIG. 2), the signal detector 218 (FIG. 2), the receiver 212 (FIG. 2), the transceiver 214 (FIG. 2), the antenna 216 (FIG. 2), and the channel estimator and equalizer 405 (FIG. 4). In some implementations, means for tracking can include the tracking circuit.

The applying circuit can be configured to apply corrections to the data channel. The applying circuit may be configured to perform one or more of the functions discussed above with respect to block 720. The applying circuit can include one or more of the processor 204 (FIG. 2), the memory 206 (FIG. 2), the DSP 220 (FIG. 2), and the channel estimator and equalizer 405 (FIG. 4). In some implementations, means for tracking can include the tracking circuit.

The detecting circuit can be configured to detect bursty interference. In some aspects, the detecting circuit may be configured to perform one or more of the functions discussed above with respect to block 730. The detecting circuit can include one or more of the processor 204 (FIG. 2), the memory 206 (FIG. 2), the DSP 220 (FIG. 2), and the channel estimator and equalizer 405 (FIG. 4). In some implementations, means for detecting can include the detecting circuit.

The refraining circuit can be configured to refrain from applying the corrections when bursty interference is detected. In some aspects, the refraining circuit can be configured to perform one or more of the functions discussed above with respect to block 740. The refraining circuit can include one or more of the processor 204 (FIG. 2), the memory 206 (FIG. 2), the DSP 220 (FIG. 2), and the channel estimator and equalizer 405 (FIG. 4). In some implementations, means for refraining can include the refraining circuit.

Figure 8:
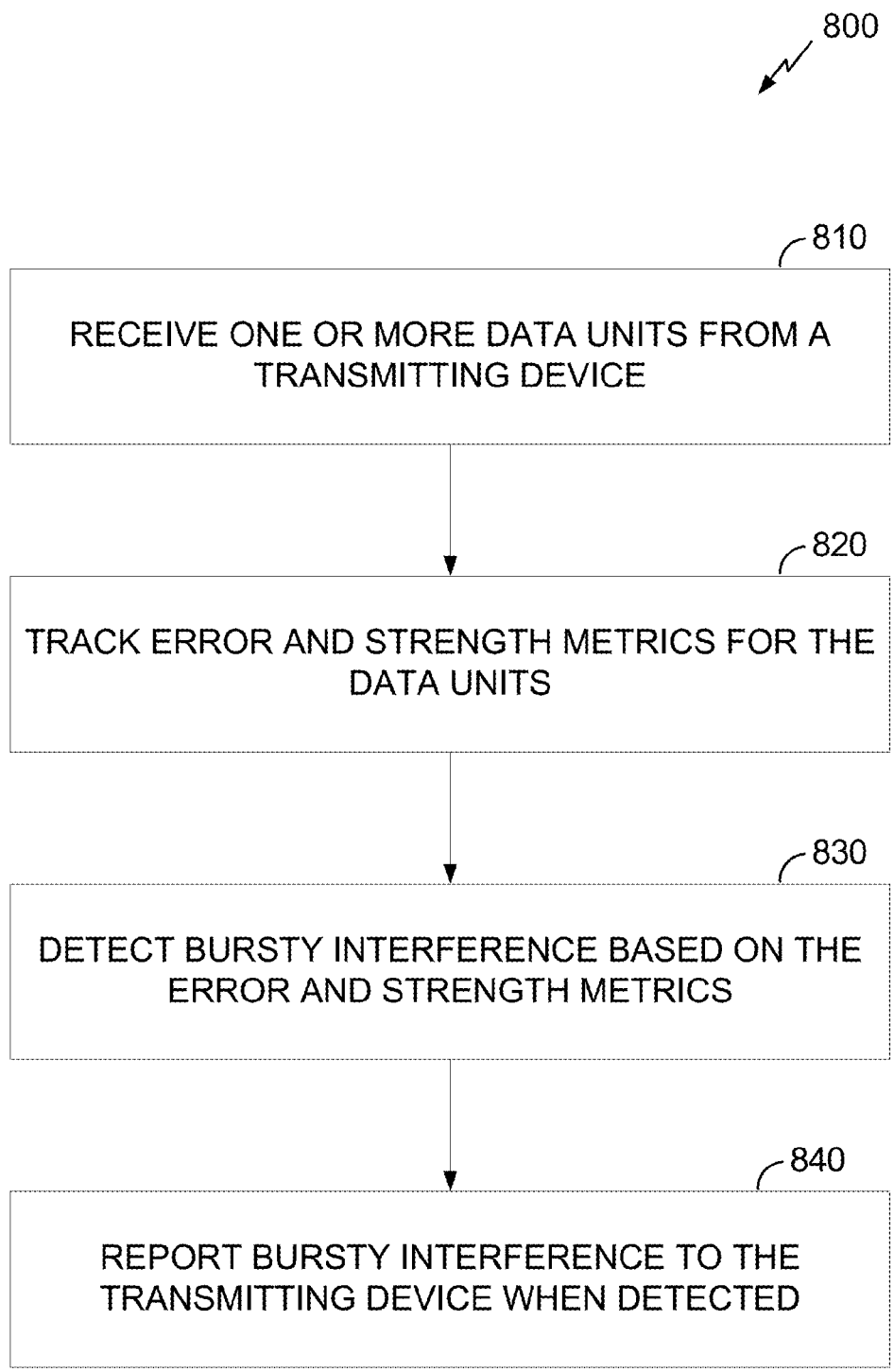
FIG. 8 is a flowchart for another exemplary method of detecting and managing interference in the wireless network of FIG. 1B.

FIG. 8 is a flowchart 800 for another exemplary method of detecting and managing interference in the wireless network 150 of FIG. 1B. In various embodiments, the wireless device 202 (FIG. 2) can use the method of flowchart 800, alone or in combination with other methods, to determine bursty interference at block 630 of FIG. 6A. The method can be implemented in whole or in part by the devices described herein, such as the wireless device 202 shown in FIG. 2. Although the illustrated method is described herein with reference to the wireless communication system 150 discussed above with respect to FIG. 1B, and the wireless device 202 discussed above with respect to FIG. 2, and the data transmission 500 discussed above with respect to FIGS. 5A-5B, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

At block 810, the wireless device 202 receives one or more data units from a transmitter. For example, the STA 106g can receive the MPDUs 520 from the AP 104b. In some embodiments, the bursty interference 530 can be present during data unit reception.

At block 820, the wireless device 202 tracks error and strength metrics for the data units. For example, the STA 106g can track a receive (RX) error vector magnitude (EVM) for the MPDUs 520 received from the AP 104b. In an embodiment, the STA 106g can estimate the RX EVM while decoding the MPDUs 520 based on the root-mean-square (RMS) distance between ideal constellation points and decoded constellation points. The STA 106g can further track a received signal strength indication (RSSI) and/or a noise floor.

When there is no bursty interference 530, the error metric may be proportional to the strength metric. For example, the RX EVM may be directly (or inversely) proportional to the RSSI (which, in some embodiments, can be defined relative to a noise floor). In other words, in the absence of bursty interference, a weak RSSI may coincide with a poor RX EVM. On the other hand, in the presence of strong bursty interference 530, the error metric may indicate high error rates, even while the strength metric indicates high strength. For example, the EX EVM may indicate a high error rate when the RSSI indicates a high signal strength.

In an embodiment, the wireless device 202 can calculate a ratio between the error metric and the strength metric, and compare the result to a threshold. In an embodiment, the wireless device 202 can calculate a ratio between the error metric and the strength metric minus a noise floor. The threshold can be predetermined and/or dynamically determined (for example, as discussed above with respect to the offset threshold). When the ratio exceeds the threshold, the wireless device 202 can determine that bursty interference is present. Likewise, when the ratio does not exceed the threshold, the wireless device 202 can determine that bursty interference is not present.

At block 840, the wireless device 202 can report bursty interference to the transmitting device. For example, the STA 106g can report bursty interference 530 to the AP 104b. Accordingly, the AP 104b may adjust or refrain from adjusting one or more transmission characteristics. In various embodiments, the wireless device 202 can report the bursty interference on a reverse channel, through a system of acknowledgements, etc.

In an embodiment, the method shown in FIG. 8 can be implemented in a wireless device that can include a receiving circuit, a tracking circuit, a detecting circuit, and a reporting circuit. Those skilled in the art will appreciate that a wireless device may have more components than the simplified wireless device described herein. The wireless device described herein includes only those components useful for describing some prominent features of implementations within the scope of the claims.

The receiving circuit can be configured to receive the one or more data units from the transmitting device. In some aspects, the receiving circuit may be configured to perform one or more of the functions discussed above with respect to block 810. The receiving circuit can include one or more of the processor 204 (FIG. 2), the memory 206 (FIG. 2), the DSP 220 (FIG. 2), the signal detector 218 (FIG. 2), the receiver 212 (FIG. 2), the transceiver 214 (FIG. 2), the antenna 216 (FIG.

2), and the channel estimator and equalizer 405 (FIG. 4). In some implementations, means for receiving can include the receiving circuit.

The tracking circuit can be configured to track the error and strength metrics for the data units. In some aspects, the tracking circuit may be configured to perform one or more of the functions discussed above with respect to block 820. The tracking circuit can include one or more of the processor 204 (FIG. 2), the memory 206 (FIG. 2), the DSP 220 (FIG. 2), the signal detector 218 (FIG. 2), the receiver 212 (FIG. 2), the transceiver 214 (FIG. 2), the antenna 216 (FIG. 2), and the channel estimator and equalizer 405 (FIG. 4). In some implementations, means for tracking can include the tracking circuit.

The detecting circuit can be configured to detect bursty interference. In some aspects, the detecting circuit may be configured to perform one or more of the functions discussed above with respect to block 830. The detecting circuit can include one or more of the processor 204 (FIG. 2), the memory 206 (FIG. 2), the DSP 220 (FIG. 2), and the channel estimator and equalizer 405 (FIG. 4). In some implementations, means for detecting can include the detecting circuit.

The reporting circuit can be configured to receive the one or more data units from the transmitting device. In some aspects, the reporting circuit may be configured to perform one or more of the functions discussed above with respect to block 840. The reporting circuit can include one or more of the processor 204 (FIG. 2), the memory 206 (FIG. 2), the DSP 220 (FIG. 2), the transmitter 210, the transceiver 214 (FIG. 2), and the antenna 216 (FIG. 2). In some implementations, means for reporting can include the reporting circuit.

Figure 9:
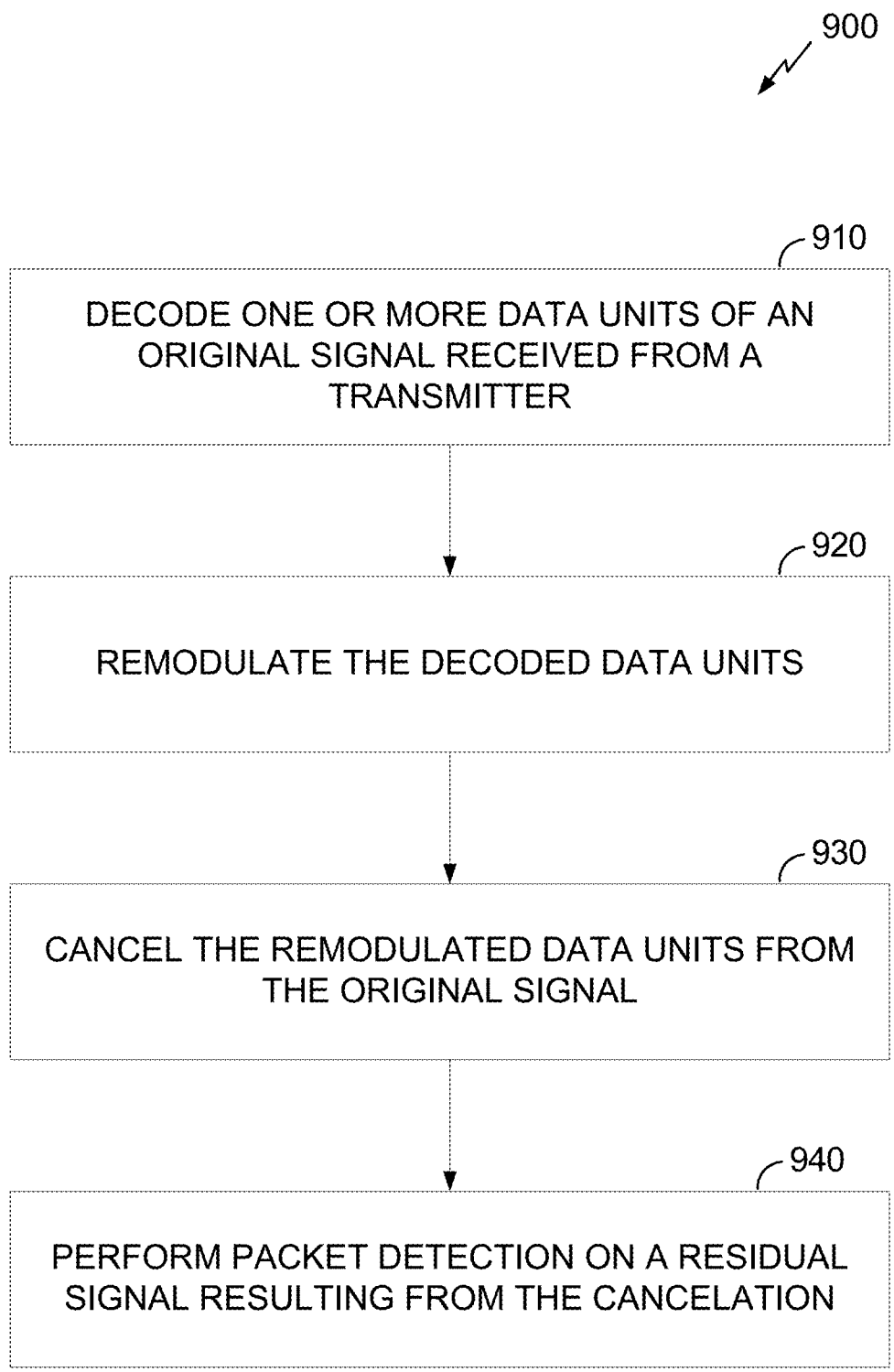
FIG. 9 is a flowchart for another exemplary method of detecting and managing interference in the wireless network of FIG. 1B.

FIG. 9 is a flowchart 900 for another exemplary method of detecting and managing interference in the wireless network 150 of FIG. 1B. In various embodiments, the wireless device 202 (FIG. 2) can use the method of flowchart 900, alone or in combination with other methods, to determine bursty interference at block 630 of FIG. 6A. The method can be implemented in whole or in part by the devices described herein, such as the wireless device 202 shown in FIG. 2. Although the illustrated method is described herein with reference to the wireless communication system 150 discussed above with respect to FIG. 1B, and the wireless device 202 discussed above with respect to FIG. 2, and the data transmission 500 discussed above with respect to FIGS. 5A-5B, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

At block 910, the wireless device 202 decodes one or more data units of an original signal received from a transmitting device. For example, referring back to FIG. 5A, the STA 106g can decode at least a portion of the MPDUs 520, represented by decoded MPDU's 560 in FIG. 5B. In some embodiments, bursty interference 530 may be present during reception and decoding of one or more MPDUs 520. In some embodiments, the interference may not be strong enough to cause failed MPDUs 570. In some aspects, bursty interference 530 may be decoded in block 910.

At block 920, the wireless device 202 remodulates the decoded data units. In some aspects of block 920, the decoded bursty interference 530 of FIG. 5A may be remodulated. In these aspects, remodulated bursty interference may indicate what the original bursty interference was.

At block 930, the wireless device 202 cancels the remodulated data units or remodulated bursty interference from the original signal. For example, in some aspects, the STA 106g can store a copy of the original signal, received from the AP 104b, in the memory 206 and subtract the remodulated signal from the stored original. In various embodiments, the STA 106g can cancel the remodulated data units partially or in stages. The STA 106g can store the canceled signal in the memory 206.

At block 940, the wireless device 202 performs packet detection on the residual signal resulting from the cancelation. In some aspects, where interference is present during transmission of the data units, the residual signal can be at least partially indicative of the interference. Accordingly, where the interference is bursty interference containing a packet transmitted by another device, the interference may contain an indication that the data is part of a packet, for example, a preamble, guard interval, etc.

In aspects where bursty interference 530 is remodulated, the residual signal can be at least partially indicative of the MPDUs 520. In some aspects, at least a portion of the failed MPDU's 570 shown in FIG. 5B may be successfully decoded from the residual signal.

If the wireless device 202 detects an indication that the residual signal includes a colliding packet (such as a preamble or guard interval), a device performing process 900 can determine that bursty interference was present during reception. Likewise, if the device performing process 900 does not detect an indication that the residual signal includes a colliding packet (such as a preamble or guard interval), the wireless device can determine that bursty interference was not present during reception.

In an embodiment, the method shown in FIG. 9 can be implemented in a wireless device that can include a decoding circuit, a remodulating circuit, a canceling circuit, and a detecting circuit. Those skilled in the art will appreciate that a wireless device may have more components than the simplified wireless device described herein. The wireless device described herein includes only those components useful for describing some prominent features of implementations within the scope of the claims.

The decoding circuit can be configured to receive and decode the one or more data units of the original signal. In some aspects, the decoding circuit may be configured to perform one or more of the functions discussed above with respect to block 910. The decoding circuit can include one or more of the processor 204 (FIG. 2), the memory 206 (FIG. 2), the DSP 220 (FIG. 2), the signal detector 218 (FIG. 2), the receiver 212 (FIG. 2), the transceiver 214 (FIG. 2), the antenna 216 (FIG. 2), and the channel estimator and equalizer 405 (FIG. 4). In some implementations, means for decoding can include the decoding circuit.

The remodulating circuit can be configured to track the error and strength metrics for the data units. In some aspects, the remodulating circuit may be configured to perform one or more of the functions discussed above with respect to block 920. The remodulating circuit can include one or more of the processor 204 (FIG. 2), the memory 206 (FIG. 2), the DSP 220 (FIG. 2), the modulator 302, the IFFT 304, and the D/A 306. In some implementations, means for remodulating can include the remodulating circuit.

The canceling circuit can be configured to cancel the remodulated data units from the original signal. In some aspects, the canceling circuit may be configured to perform one or more of the functions discussed above with respect to block 930. The canceling circuit can include one or more of the processor 204 (FIG. 2), the memory 206 (FIG. 2), and the DSP 220 (FIG. 2). In some implementations, means for canceling can include the canceling circuit.

The detecting circuit can be configured to perform packet detection on a residual signal resulting from the cancelation performed by the canceling circuit. In some aspects, the detecting circuit may be configured to perform one or more of the functions discussed above with respect to block 940. The detecting circuit can include one or more of the processor 204 (FIG. 2), the memory 206 (FIG. 2), the DSP 220 (FIG. 2), and the signal detector 218. In some implementations, means for detecting can include the detecting circuit.

Figure 10A:
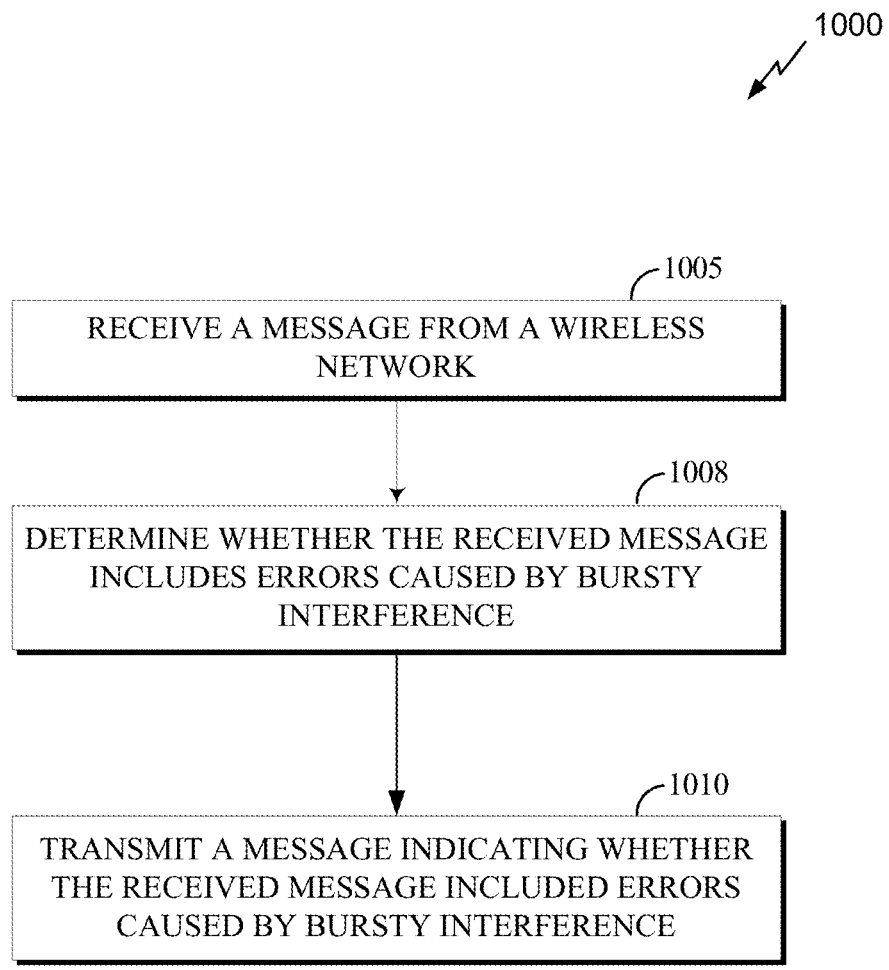
FIG. 10A is a flowchart of one implementation of a method of signaling the presence of bursty interference on a wireless network.

FIG. 10A is a flowchart of one implementation of a method of signaling the presence of bursty interference on a wireless network. In some aspects, process 1000 may be performed by wireless device 202, illustrated in FIG. 2. In some aspects, process 1000 may be performed by a station. In some aspects, process 1000 may be performed by an access point. In some aspects, process 1000 may be performed by a relay. In block 1005 a message is received from a wireless network. The message may be received during a contention period or during a contention free period.

In block 1008, whether the received message includes errors caused by bursty interference is determined. In some aspects, error detection may be performed on the received message. For example a receiving node may track a channel used to receive the message using pilot tones in OFDM symbols. A phase offset may be estimated based on the pilot tones. The phase offset measures the change of phase in the channel. A receiver may also determine a frequency offset based on the pilot tones. The phase offset and frequency offset of the channel may be determined periodically or repeatedly. In some aspects, if the difference between two determined phase offsets and/or the difference between two determined frequency offsets is above a corresponding threshold value, the receiver may determine that bursty interference has occurred.

In some aspects, a receiving node may estimate an error vector magnitude (EVM) when decoding a wireless message. The EVM may be determined based on a root-mean-square (RMS) distance between ideal constellation points and decoded constellation points. The receiving node may determine that bursty interference is present if the EVM is higher than expected for a current RSSI measurement. For example, if the RSSI measurement is strong, a low EVM would be expected. If the EVM is high despite a strong RSSI, the receiving node may determine that bursty interference is present.

In some aspects, a receiving node may remodulate a decoded signal based on a received signal and cancel it against the received signal. Some aspects may determine the presence of bursty interference based on the signal after cancelation. In some aspects, the canceled signal may be provided as an input to a preamble detector and/or a guard interval detector. An output of the preamble detector and/or guard interval detector may be used to detect the presence of an interfering Wi-Fi signal. The output of either detector may also be used to estimate the strength of the interfering Wi-Fi signal.

In some aspects, a receiving node performing process 1000 may utilize one or more of processes 600, 700, 800, 900, described with respect to FIG. 6A, 7, 8, or 9 respectively to detect bursty interference.

In block 1010, a message is transmitted indicating whether the received message included errors caused by bursty interference. The indication may be set based on the error detection described above. In some aspects, the transmitted message is a block acknowledgement message. A block acknowledgment message indicating bursty interference may be transmitted when multiple MPDUs are being acknowledged. In one aspect, whether any errors were caused by bursty interference may be indicated in a reserved field of a block acknowledgment message. In some aspects, the transmitted message may serve as a negative acknowledgement to a single MPDU. For example, a negative acknowledgement may be transmitted in response to reception of a single MPDU. In some of these aspects, the presence of bursty interference may be indicated by a receiver address field of the transmitted message. For example, a broadcast receiver address may indicate the presence of bursty interference in the received message in some aspects.

In some aspects, the message may include an indication of the numerosity of errors in the received message caused by bursty interference. For example, in some aspects, the transmitted message may include a field that encodes, in binary form, an indication of a number of bursty errors in the received message. In other embodiments, the transmitted message may include a more coarse indication of numerosity. For example, the message may indicate the number of bursty errors detected in the received message divided by a constant. For example, 1-10 errors may be indicated by an encoded value of one (1), while 11-20 errors may be indicated by an encoded value of two (2) in the transmitted message. In another aspect, the message may indicate whether no bursty errors were detected, a single bursty error was detected, or multiple bursty errors were detected.

Figure 10B:
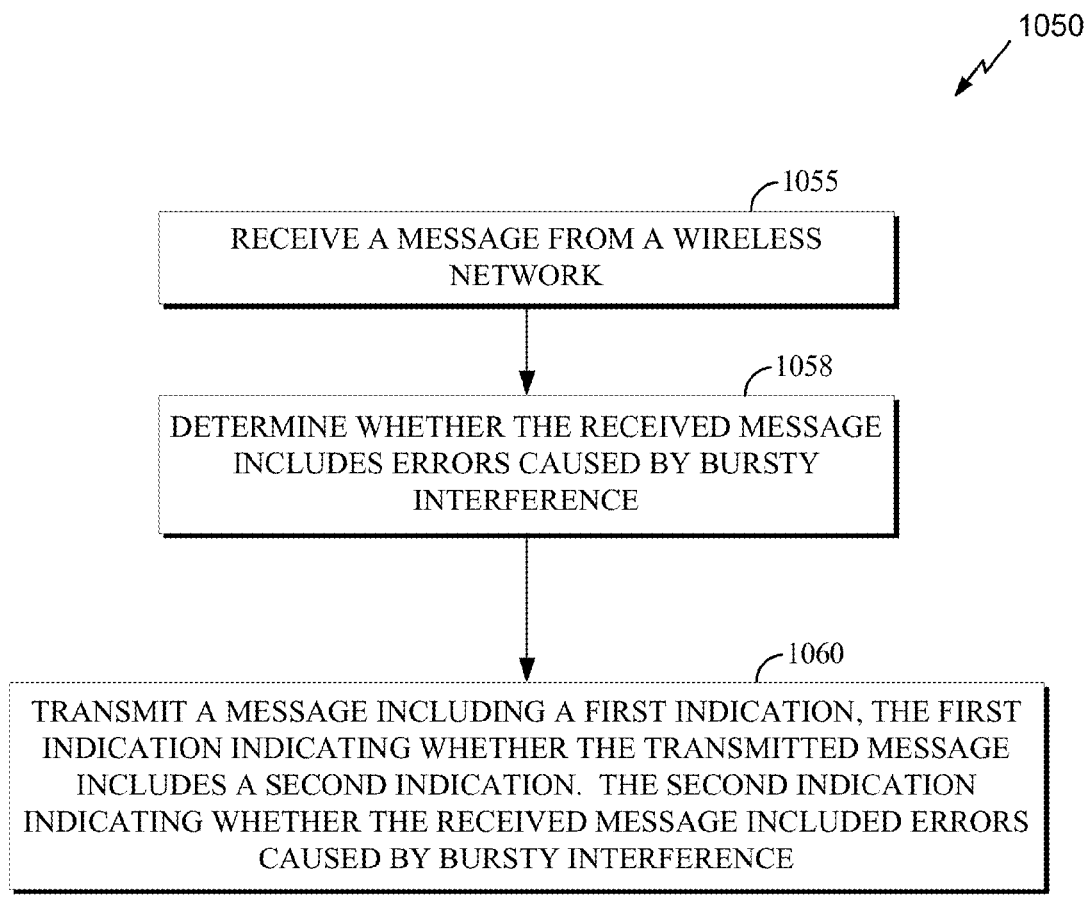
FIG. 10B is a flowchart of one implementation of a method of indicating whether information on bursty interference is being signaled on a wireless communication network.

FIG. 10B is a flowchart of one implementation of indicating whether information on bursty interference is being signaled on a wireless communication network. In some aspects, process 1050 may be performed by wireless device 202, illustrated in FIG. 2. In some aspects, process 1050 may be performed by a station. In some aspects, process 1050 may be performed by an access point. In some aspects, process 600 may be performed by a relay. In block 1055, a message is received from a wireless network.

In block 1058, whether the received message includes errors caused by bursty interference is determined. In some aspects, error detection may be performed on the received message. For example a receiving node may track a channel used to receive the message using pilot tones in OFDM symbols. A phase offset may be estimated based on the pilot tones. The phase offset measures the change of phase in the channel. A receiver may also determine a frequency offset based on the pilot tones. The phase offset and frequency offset of the channel may be determined periodically or repeatedly. In some aspects, if the difference between two determined phase offsets and/or the difference between two determined frequency offsets is above a corresponding threshold value, the receiver may determine that bursty interference has occurred.

In some aspects, a receiving node may estimate an error vector magnitude (EVM) when decoding a wireless message. The EVM may be determined based on a root-mean-square (RMS) distance between ideal constellation points and decoded constellation points. The receiving node may determine that bursty interference is present if the EVM is higher than expected for a current RSSI measurement. For example, if the RSSI measurement is strong, a low EVM would be expected. If the EVM is high despite a strong RSSI, the receiving node may determine that bursty interference is present.

In some aspects, a receiving node may remodulate a decoded signal based on a received signal and cancel it against the received signal. Some aspects may determine the presence of bursty interference based on the signal after cancelation. In some aspects, the canceled signal may be provided as an input to a preamble detector and/or a guard interval detector. An output of the preamble detector and/or guard interval detector may be used to detect the presence of an interfering Wi-Fi signal. The output of either detector may also be used to estimate the strength of the interfering Wi-Fi signal.

In some aspects, a receiving node performing process 1050 may utilize one or more of processes 600, 700, 800, 900, described with respect to FIG. 6A, 7, 8, or 9 respectively to detect bursty interference.

In block 1060, a message is transmitted including a first indication. The first indication indicates whether the transmitted message includes a second indication. The second indication indicates whether the received message included errors caused by bursty interference. In some aspects, the first message indicates that the transmitted message does not include the second indication. In some aspects, the first indication indicates that the transmitted message does include the second indication. In some aspects, the transmitted message is a block acknowledgement message. In some aspects, a receiving node performing process 1050 may utilize one or more of processes 600, 700, 800, 900, described with respect to FIG. 6, 7, 8, 9, or 10, respectively to detect bursty interference.

A block acknowledgment message indicating bursty interference may be transmitted by block 1060 when multiple MPDUs are being acknowledged. In one aspect, whether the transmitted message indicates if the received message included errors caused by bursty interference may be indicated in a reserved field of the block acknowledgement message. In other words, the first indication discussed above may be included in the reserved field of the block acknowledgement message. If the transmitted message does include an indication of bursty interference errors, the indication may be provided by the reserved field of the block acknowledgment message. In other words, the second indication discussed above may also be included in the reserved field of the block acknowledgement message.

In some aspects, the transmitted message may serve as a negative acknowledgement to a single MPDU. In some of these aspects, the presence of bursty interference may be indicated by a receiver address field of the transmitted message. For example, a broadcast receiver address may indicate the presence of bursty interference in the received message in some aspects.

In some aspects, the transmitted message may include an indication of the numerosity of errors in the received message caused by bursty interference. For example, in some aspects, the transmitted message may include a field that encodes, in binary form, an indication of a number of bursty errors in the received message. In other embodiments, the transmitted message may include a more coarse indication of numerosity. For example, the message may indicate the number of bursty errors detected in the received message divided by a constant. For example, 1-10 errors may be indicated by an encoded value of one (1), while 11-20 errors may be indicated by an encoded value of two (2) in the transmitted message. In another aspect, the message may indicate whether no bursty errors were detected, a single bursty error was detected, or multiple bursty errors were detected.

In some aspects, a device performing process 1050 may utilize one or more of processes 600, 700, 800, 900, described with respect to FIG. 6A, 7, 8, or 9 respectively to detect bursty interference.

Figure 11A:
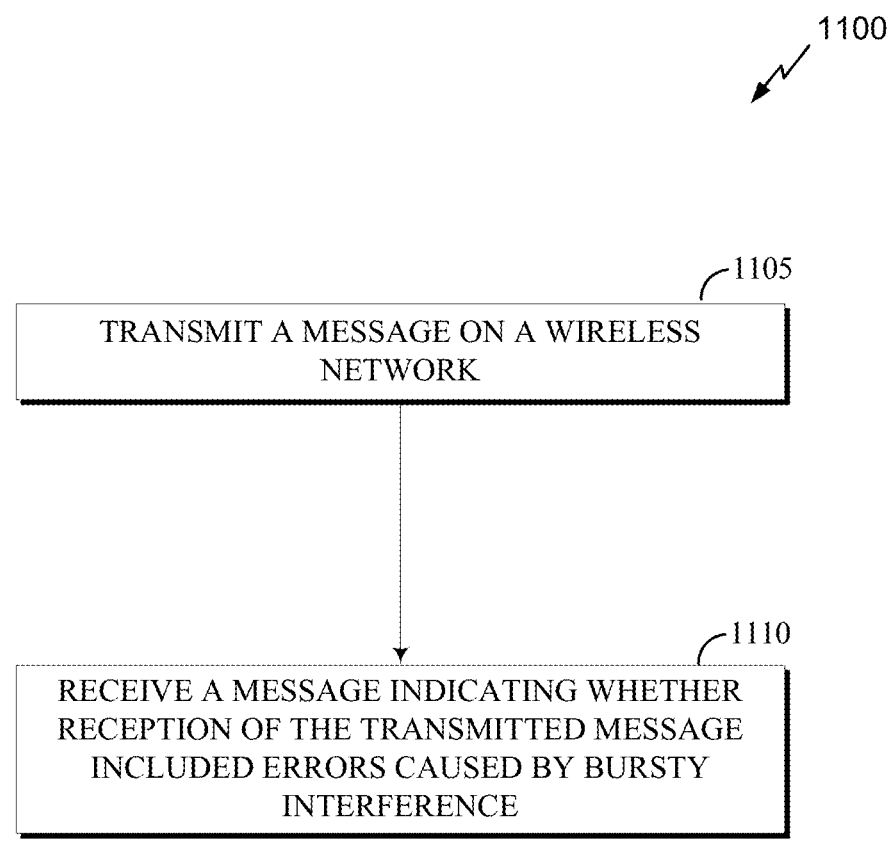
FIG. 11A is a flowchart of one implementation of a method of signaling the presence of bursty interference on a wireless network.

FIG. 11A is a flowchart of one implementation of a method of signaling the presence of bursty interference on a wireless network. In some aspects, process 1100 may be performed by wireless device 202, illustrated in FIG. 2. In some aspects, process 1100 may be performed by a station. In some aspects, process 1100 may be performed by an access point. In some aspects, process 1100 may be performed by a relay. In block 1105 a message is transmitted on a wireless network.

In block 1110, a message is received indicating whether reception of the transmitted message included errors caused by bursty interference. In some aspects, the received message is a block acknowledgement. In some of these aspects, the indication is indicated by one or more reserved bits in the block acknowledgement.

In some aspects, the received message is a negative acknowledgement for a single MPDU. In some aspects, a multicast receiver address field in the received message indicates errors caused by bursty interference. In some other aspects, a type and/or subtype field of a frame control field may indicate a negative acknowledgement. The message may then include an additional field indicating whether reception of the transmitted message included errors caused by bursty interference.

In some aspects, the indication indicates the numerosity of errors caused by bursty interference. For example, in some aspects, the received message may include a field that encodes, in binary form, a number of bursty errors that occurred during reception of the transmitted message. In other embodiments, the received message may include a more coarse indication of numerosity. For example, the message may indicate the number of bursty errors detected during reception of the transmitted message divided by a constant. For example, 1-10 errors may be indicated by an encoded value of one (1), while 11-20 errors may be indicated by an encoded value of two (2) in the received message. In another aspect, the received message may indicate whether no bursty errors were detected, a single bursty error was detected, or multiple bursty errors were detected.

In some aspects, the method further comprises modifying transmission parameters based on the indication. For example, in some aspects, the transmission of messages on the wireless network may be duplicated in response to the indication. In some aspects, raptor codes may be used when transmitting duplicate messages. In some aspects, transmission of messages on the wireless network may be deferred based on the indication. For example, the transmission of all transmissions may be deferred by use of a back-off algorithm. In some aspects, transmissions of messages to a wireless node transmitting the received message may be deferred. For example, the transmission priority of messages destined for the node may be reduced relative to the transmission priority of messages destined to other wireless nodes.

Figure 11B:
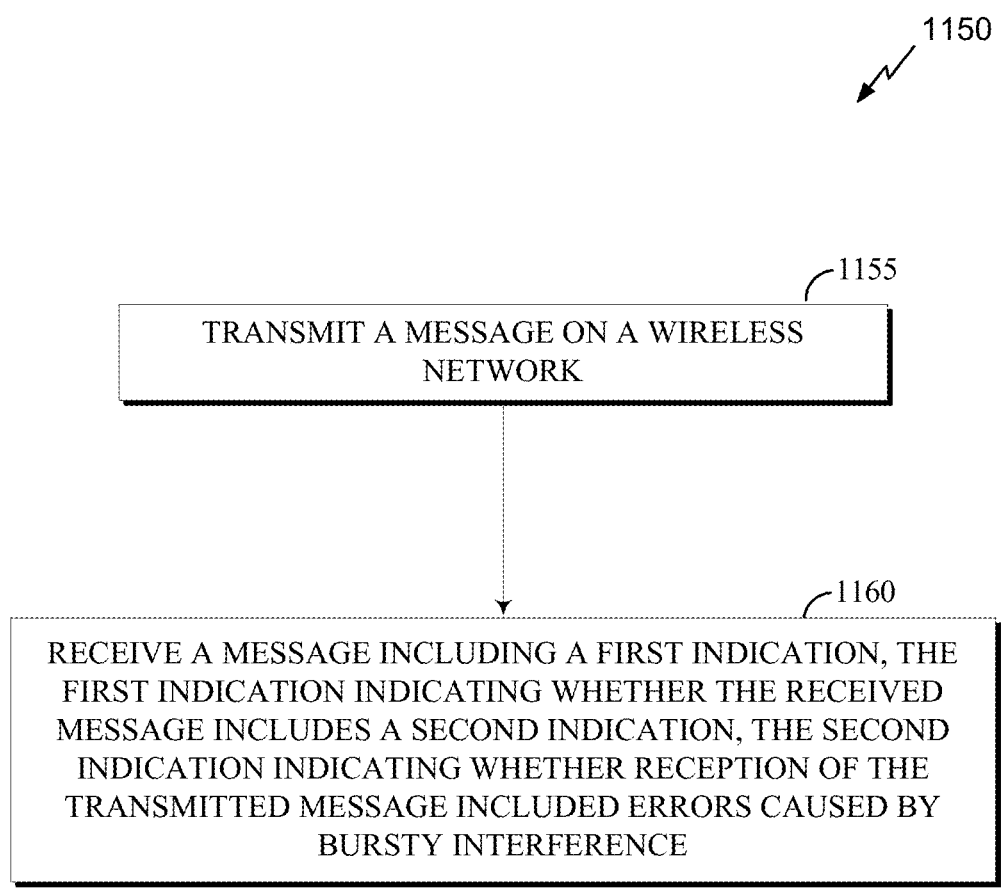
FIG. 11B is a flowchart of one implementation of a method of indicating whether information on bursty interference is being signaled on a wireless communication network.

FIG. 11B is a flowchart of one implementation of a method of signaling the presence of bursty interference on a wireless network. In some aspects, process 1150 may be performed by wireless device 202, illustrated in FIG. 2. In some aspects, process 1150 may be performed by a station. In some aspects, process 1150 may be performed by an access point. In some aspects, process 1150 may be performed by a relay.

In block 1155 a message is transmitted on a wireless network. In block 1160, a message is received including a first indication. The first indication indicates whether the received message includes a second indication. The second indication indicates whether reception of the transmitted message included errors caused by bursty interference. In one aspect, the first indication in the transmitted message indicates that the received message does not include the second indication. In another aspect, the first indication indicates that the message does include the second indication.

In some aspects, the received message is a block acknowledgement. In some of these aspects, the indication of whether the received message includes information on whether reception of the transmitted message included errors caused by bursty interference is indicated by one or more reserved bits in the block acknowledgement. If the received message does include the indication of whether reception of the transmitted message included errors caused by bursty interference, then this indication may be indicated by one or more reserved bits of the block acknowledgement as well. In other words, both the first and/or second indications discussed above may be included in one or more reserved bits of the block acknowledgement message.

In some aspects, the received message is a negative acknowledgement for a single MPDU. In some aspects, a multicast receiver address field in the received message indicates errors caused by bursty interference. In some other aspects, a type and/or subtype field of a frame control field may indicate a negative acknowledgement. The message may then include an additional field indicating whether reception of the transmitted message included errors caused by bursty interference.

In some aspects, the indication indicates the numerosity of errors caused by bursty interference. For example, in some aspects, the received message may include a field that encodes, in binary form, a number of bursty errors that occurred during reception of the transmitted message. In other embodiments, the received message may include a more coarse indication of numerosity. For example, the message may indicate the number of bursty errors detected during reception of the transmitted message divided by a constant. For example, 1-10 errors may be indicated by an encoded value of one (1), while 11-20 errors may be indicated by an encoded value of two (2) in the received message. In another aspect, the received message may indicate whether no bursty errors were detected, a single bursty error was detected, or multiple bursty errors were detected.

In some aspects, the method further comprises modifying transmission parameters based on the indication. For example, in some aspects, the transmission of messages on the wireless network may be duplicated in response to the indication. In some aspects, raptor codes may be used when transmitting duplicate messages. In some aspects, transmission of messages on the wireless network may be deferred based on the indication. For example, the transmission of all transmissions may be deferred by use of a back-off algorithm. In some aspects, transmissions of messages to a wireless node transmitting the received message may be deferred. For example, the transmission priority of messages destined for the node may be reduced relative to the transmission priority of messages destined to other wireless nodes.

Figure 12:
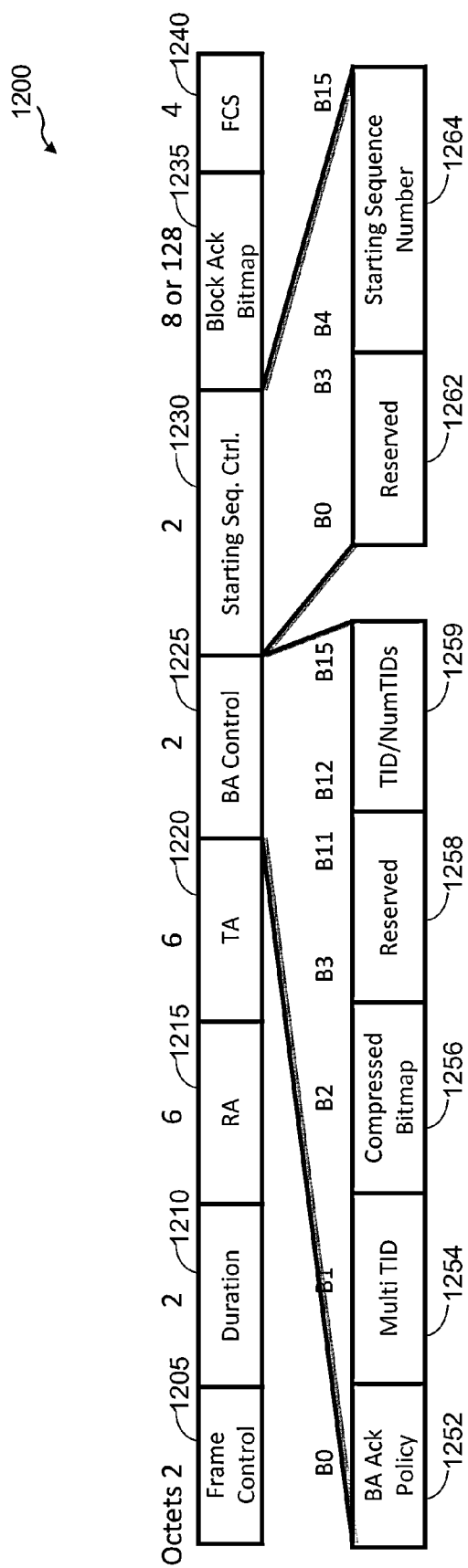
FIG. 12 illustrates an example of a basic block ACK frame.

FIG. 12 illustrates an example of a basic block ACK frame 1200. As shown, the basic block ACK frame includes a frame control field 1205 comprising 2 octets, a duration field 1210 comprising 2 octets, a receiver address field 1215 comprising 6 octets, a transmitter address field 1220 comprising 6 octets, a block ACK control field 1225 comprising 2 octets, a starting sequence control field 1230 comprising 2 octets, a block ACK bitmap 1235 comprising 8 or 128 octets, and a frame check sequence field 1240 comprising 4 octets. Further, the block ACK control field 1225 comprises a block ACK policy subfield 1252, a multi traffic identifier (TID) subfield 1254, a compressed bitmap subfield 1256, a reserved subfield 1258, and a TID/NumTIDs subfield 1259. The starting sequence control field 1230 comprises a reserved subfield 1262 and a starting sequence number subfield 1264. Accordingly, the block ACK frame 1200 can be 32 bytes or 152 bytes long.

In some aspects disclosed herein, one or more fields of the block ACK frame 1200 may indicate whether a received message included errors caused by bursty interference. For example, in some aspects, the message transmitted in block 1010 or 1060 above may conform to the format of block ACK frame 1200. In some aspects, the message received in block 1110 of process 1100 or block 1160 of process 1150 may conform to the format of block ACK frame 1200. In some aspects, one or more bits of the reserved field 1258 may indicate whether a received message included errors caused by bursty interference. For example, in some aspects one bit of the reserved field may provide the indication. One value of the bit may indicate at least some of the MPDU's acknowledged by the block acknowledgement frame included an error caused by bursty interference. The other value of the bit may indicate no bursty interference errors were detected. In another aspect, two bits of the reserved field 1258 may provide an indication of bursty interference. For example, in one aspect, the bits may be assigned indications as shown in table 1 below. In some other aspects, more bits may be used to indicate whether the node is including any information about bursty interference. In some other aspects, capability bits set during association can be used to indicate whether a node will transmit messages indicating bursty interference or not.

TABLE 1

| First Bit | Second Bit | Indication |
| --- | --- | --- |
| 0 | 0 | No Information Available |
| 0 | 1 | No Bursty Interference Detected |
| 1 | 0 | One Error Due to Bursty Interference Detected |
| 1 | 1 | More Than One Error Due to Bursty Interference Detected |

FIG. 13 shows an exemplary structure of a media access control (MAC) frame 1300. As shown, the MAC frame 1300 includes 11 different fields: a frame control (fc) field 1310, a duration/identification (dur) field 1325, a receiver address (a1) field 1330, a transmitter address (a2) field 1335, a destination address (a3) field 1340, a sequence control (sc) field 1345, a fourth address (a4) field 1350, a quality of service (QoS) control (qc) field 1355, a High Throughput (HT) control field 1360, the frame body 1365, and a frame check sequence (FCS) field 1370. The fields 1310-1360 make up the MAC header 1302.

Each of the fields of a media access control frame may be considered a media access control parameter. Additionally, each field may be comprised of one or more sub-fields or fields. For example, frame control field 1310 of media access control header 1302 may be comprised of multiple subfields, such as a protocol version, type field, subtype field, and other fields discussed below with respect to FIG. 14. Each of these subfields or fields may also be considered a media access control parameter. In some embodiments, individual bits of a media access control frame may be considered a media access control parameter.

Each of the a1, a2, a3, and a4 fields 1330, 1335, 1340, and 1350 comprises a full MAC address of a device, which is a 48-bit (6 octet) value. FIG. 13 further indicates the size in octets of each of the fields 1310-1370. The frame body field 1365 comprises a variable number of octets (e.g., from 0 to 7951). Summing the value of all of the field sizes gives the overall size of the MAC header 1302, which is 38 octets. The total size of a given packet may be on the order of 200 octets.

MAC frames of different types may include only a portion of the fields shown in FIG. 13. For example, if a MAC frame is a control frame, the MAC frame may not include the QoS control field 1355 or the HT control field 1360. In addition, depending on the type, the MAC frame 1300 may include additional fields. However, in some cases, regardless of the type, the MAC frame 1300 may include the frame control field 1310.

FIG. 14 shows an exemplary structure of a frame control field 1310 of the MAC header 1302 shown in FIG. 13. As shown, the frame control field 1310 includes a protocol version field 1411, a type field 1412, a subtype field 1413, a To DS field 1414, a from DS field 1415, a more fragments field 1416, a retry field 1417, a power management field 1418, a more data field 1419, a protected frame field 1420, and an order field 1421. The type of the MAC frame 1300 may be defined by the combination of type and subtype fields 1412 and 1413. For example, for a management frame, the type field 1412 may have a binary value of 00. The subtype field 1413 may then indicate the type of management field with a four bit value providing 16 different management field types. As another example, the type of MAC frame 1300 may be a control frame indicated by a type field 1412 with a binary value of 01. The subtype field 1413 may further indicate different types of control fields such as block ack request frames, block ack frames, ps-poll frames, request to send (RTS) fields, clear to send (CTS) fields, and the like.

In some cases it may be advantageous to define new types and formats of MAC frames for different uses/purposes. For example, it may be beneficial to define additional frame types to provide indications of bursty interference on a wireless network. In one aspect, a value of one (0x01) in the type field 1412 may indicate a control frame. In some aspects, when the type field 1412 indicates a control frame, a value of the subtype field 1413 may indicate a negative acknowledgement. In some of these aspects, one or more of fields 1330-1360 may not be included in the MAC header 1302. Instead, other fields may be included that indicate the presence or lack thereof of bursty interference.

FIG. 15 shows an exemplary structure of a media access control (MAC) frame 1500. Similar to MAC frame 1300 discussed above, MAC frame 1500 may include a type field and subtype field within frame control field 1510. In some aspects, one or more combinations of values of the type field and subtype field may indicate the presence of field 1530. Some of these combinations may also indicate a negative acknowledgement of a single MPDU. In some aspects, field 1530 provides an indication of whether the received MPDU include errors caused by bursty interference as discussed above with respect to FIGS. 10A, 10B, 11A, and 11B. While FIG. 15 shows that the bursty errors indication field 1530 is six octets in length, the length may vary by embodiment. For example, in some aspects, the length of the bursty errors indication field 1530 may be 1, 2, 3, 4, 5, 6, 7, or 8 bits in length. In some other aspects, the length of the bursty errors indication field 1530 may be 1, 2, 3, 4, 5, 6, 7, 8, 9, or 10 bytes in length.

Figure 16:
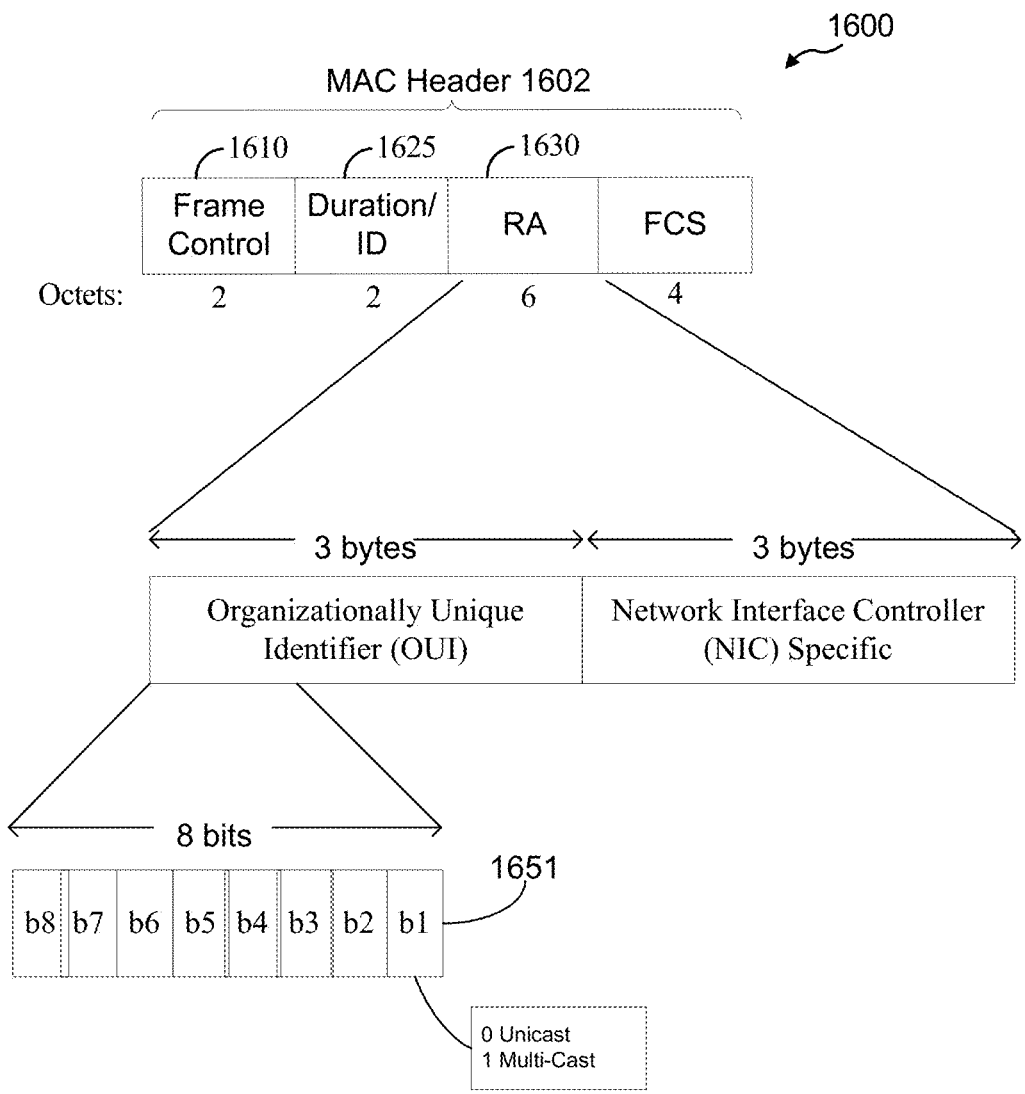
FIG. 16 shows an exemplary structure of a media access control (MAC) frame.

FIG. 16 shows an exemplary structure of a media access control (MAC) frame 1600. In some aspects, the message received in block 1110 of FIG. 11A or 1160 of FIG. 11B may be of a format described by MAC frame 1100. In some aspects, the message transmitted in block 1010 of FIG. 10A or block 1060 of FIG. 10B may be of the format described by MAC frame 1600. In some aspects, a type/subtype field of frame control field 1610 may indicate an acknowledgement frame. In some aspects, the receiver address field 1630 may indicate whether bursty interference was present when a wireless message was received. For example, as shown, bit 1651 within the receiver address field 1630 may indicate whether one or more errors in a received wireless message were caused by bursty interference. In some aspects, a value of one (1) indicates that a received message included errors caused by bursty interference.

Figure 17:
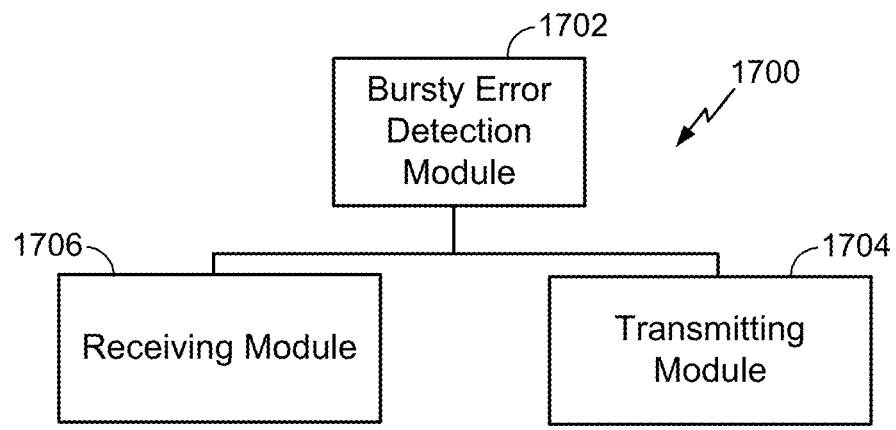
FIG. 17 is a functional block diagram an exemplary wireless device that may be employed within a wireless communication system.

FIG. 17 is a functional block diagram an exemplary wireless device 1700 that may be employed within the wireless communication system 100, 101, or 150. Those skilled in the art will appreciate that a wireless communication device 1700 may have more or less components than the wireless communication devices shown in FIGS. 2-4. The device 1700 comprises a receiving module 1706 for wirelessly receiving data. The receiving module 1706 may be configured to perform one or more of the functions discussed above with respect to the block 1005 illustrated in FIG. 10A or block 1055 of FIG. 10B. The receiving module 1706 may correspond to the receiver 212, and may include the amplifier 401. In some cases, a means for receiving may include the receiving module 1706. The device 1700 further comprises a transmitting module 1704. The transmitting module 1704 and may be configured to perform one or more of the functions discussed above with respect to block 1010 of FIG. 10A or block 1060 of FIG. 10B. In some aspects, a means for transmitting comprises the transmitting module 1704. The transmitting module 1704 may include a variety of components including, but not limited to, a constellation mapper, a modulator, an IDFT (inverse discrete time fourier transform module or IFFT 304 as described above with reference to FIG. 3), a digital to analog converter, an amplifier, an antenna, and other components. The device 1700 may further comprise a bursty error detection module 1702. The bursty error detection module 1702 may be configured to detect one or more errors caused by bursty interference, as discussed above with respect to FIG. 10A or FIG. 10B. For example, in some aspects, the bursty error detection module 1702 may be configured to perform one or more of the functions discussed above with respect to blocks 1008 and/or 1058. In some aspects, the bursty error detection module 1702 may comprise the processor 204. In some cases, a means for detecting bursty interference comprises the bursty error detection module 1702. Some implementations of device 1700 may not include a bursty error detection module 1702.

Figure 18:
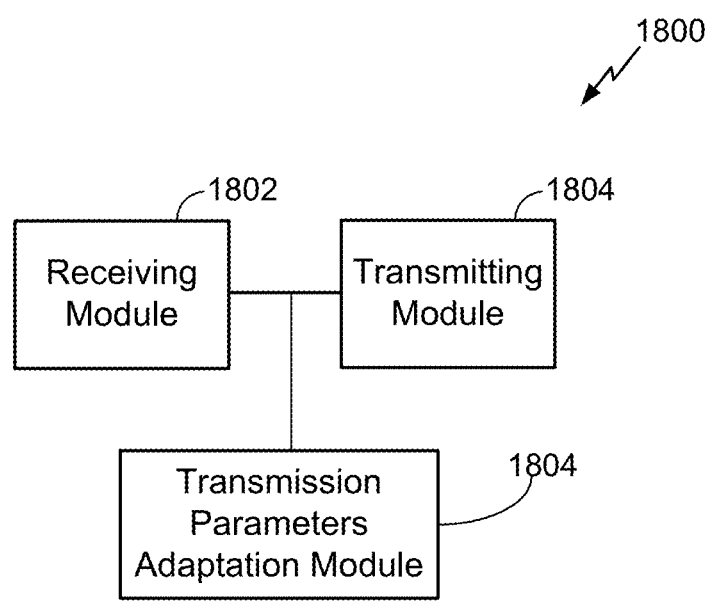
FIG. 18 is a functional block diagram an exemplary wireless device that may be employed within a wireless communication system.

FIG. 18 is a functional block diagram an exemplary wireless device 1800 that may be employed within the wireless communication system 100, 101, or 150. Those skilled in the art will appreciate that a wireless communication device 1800 may have more or less components than the wireless communication devices shown in FIGS. 2-4. The device 1800 comprises a receiving module 1802 for wirelessly receiving data. The receiving module 1802 may be configured to perform one or more of the functions discussed above with respect to the block 1110 illustrated in FIG. 11A or block 1160 of FIG. 11B. The receiving module 1802 may correspond to the receiver 212, and may include the amplifier 401. In some cases, a means for receiving may include the receiving module 1802. The device 1800 further comprises a transmitting module 1804. The transmitting module 1804 and may be configured to perform one or more of the functions discussed above with respect to block 1105 of FIG. 11A or block 1155 of FIG. 11B. In some cases a means for transmitting comprises the transmitting module 1804. The transmitting module 1804 may include a variety of components including, but not limited to, a constellation mapper, a modulator, an IDFT (inverse discrete time Fourier transform module or IFFT 304 as described above with reference to FIG. 3), a digital to analog converter, an amplifier, an antenna, and other components. The device 1800 may further comprise a transmission parameters adaptation module 1804. The transmission parameters adaptation module 1804 may be configured to adapt transmission parameters of device 1800 based on an indication of bursty interference, as discussed above with respect to process 1100 of FIG. 11A or process 1150 of FIG. 11B. In some aspects, the transmission parameters adaptation module 1804 may comprise the processor 204. In some cases, a means for adapting transmission parameters comprises the transmission parameters adaptation module 1804.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of signaling the presence of bursty interference on a wireless network, comprising:
   receiving a message from the wireless network;
   determining whether the message includes errors caused by bursty interference, wherein said determining comprises:
      tracking phase and/or frequency offsets for a pilot channel,
      comparing the tracked phase offsets to a first threshold and/or comparing the tracked frequency offsets to a second threshold,
      applying corrections to a data channel based on the tracked phase and/or frequency offsets in response to the tracked phase and/or frequency offsets being below their corresponding thresholds, and
      detecting bursty interference in the data channel in response to the first or second thresholds being exceeded; and
   transmitting a block acknowledgement message, the block acknowledgement message indicating whether the received message included errors caused by bursty interference.

2. The method of claim 1, wherein said determining comprises:
   tracking error and strength metrics for the message; and
   detecting bursty interference based on the error and strength metrics.

3. The method of claim 2, wherein detecting bursty interference based on the error and strength metrics comprises calculating a ratio between the error and strength metrics and comparing the ratio to a threshold.

4. The method of claim 2, wherein the error metric comprises a receive error vector magnitude (EVM) and the strength metric comprises a received signal strength indicator (RSSI) minus a noise floor.

5. The method of claim 1, wherein said determining comprises:
   decoding the message;
   remodulating the decoded message;
   canceling the remodulated message from the original received message;
   performing packet detection on a residual signal resulting from the cancelation;
   determining the message includes errors caused by bursty interference in response to detecting a packet in the residual signal.

6. The method of claim 1, further comprising suspending a channel tracking when bursty interference is detected.

7. The method of claim 1, further comprising generating the block acknowledgment message to include an indicator of whether the block acknowledgement message indicates whether the received message included errors caused by bursty interference.

8. An apparatus for signaling the presence of bursty interference on a wireless network, comprising:
   a receiver configured to receiving a message from the wireless network;
   a processor configured to determine whether the message includes errors caused by bursty interference, wherein said determining comprises:
      tracking phase and/or frequency offsets for a pilot channel,
      comparing the tracked phase offsets to a first threshold and/or comparing the tracked frequency offsets to a second threshold,
      applying corrections to a data channel based on the tracked phase and/or frequency offsets in response to the tracked phase and/or frequency offsets being below their corresponding thresholds, and
      detecting bursty interference in the data channel in response to the first or second thresholds being exceeded; and
   a transmitter configured to transmit a block acknowledgement message, the block acknowledgement message indicating whether the received message included errors caused by bursty interference.

9. The apparatus of claim 8, wherein said determining comprises:
   tracking error and strength metrics for the message; and
   detecting busty interference based on the error and strength metrics.

10. The apparatus of claim 9, wherein detecting bursty interference based on the error and strength metrics comprises calculating a ratio between the error and strength metrics and comparing the ratio to a threshold.

11. The apparatus of claim 9, wherein the error metric comprises a receive error vector magnitude (EVM) and the strength metric comprises a received signal strength indicator (RSSI) minus a noise floor.

12. The apparatus of claim 8, wherein said determining comprises:
   decoding the message;
   remodulating the decoded message;
   canceling the remodulated message from the original received message;
   performing packet detection on a residual signal resulting from the cancelation; and
   determining the message includes errors caused by bursty interference in response to detecting a packet in the residual signal.

13. The apparatus of claim 8, further comprising a processor configured to suspending a channel tracking when bursty interference is detected.

14. The apparatus of claim 8, further comprising a processor configured to generate the block acknowledgment message to include an indicator of whether the block acknowledgment message indicates whether the received message included errors caused by bursty interference.

15. An apparatus for signaling the presence of bursty interference on a wireless network, comprising:
   means for receiving a message from the wireless network;
   means for determining whether the message includes errors caused by bursty interference configured to:
      track phase and/or frequency offsets for a pilot channel,
      compare the tracked phase offsets to a first threshold and/or comparing the tracked frequency offsets to a second threshold,
      apply corrections to a data channel based on the tracked phase and/or frequency offsets in response to the tracked phase and/or frequency offsets being below their corresponding thresholds, and
      detect bursty interference in the data channel in response to the first or second thresholds being exceeded; and means for transmitting a block acknowledgement message, the block acknowledgement message indicating whether the received message included errors caused by bursty interference.

16. The apparatus of claim 15, wherein said means for determining is configured to determine whether the message includes errors caused by bursty interference by:
    decoding the message;
    remodulating the decoded message;
    canceling the remodulated message from the original received message;
    performing packet detection on a residual signal resulting from the cancelation; and
    determining the message includes errors caused by bursty interference in response to detecting a packet in the residual signal.

17. The apparatus of claim 15, for generating the block acknowledgment message to include an indicator of whether the block acknowledgment message indicates whether the first message included errors caused by bursty interference.

18. A non-transitory computer readable storage medium comprising instructions that when executed by a processor cause it to perform a method of signaling the presence of bursty interference on a wireless network, the method comprising:
    receiving a message from the wireless network;
    determining whether the message includes errors caused by bursty interference by:
        tracking phase and/or frequency offsets for a pilot channel,
        comparing the tracked phase offsets to a first threshold and/or comparing the tracked frequency offsets to a second threshold,
        applying corrections to a data channel based on the tracked phase and/or frequency offsets in response to the tracked phase and/or frequency offsets being below their corresponding thresholds, and
        detecting bursty interference in the data channel in response to the first or second thresholds being exceeded; and
    transmitting a block acknowledgement message, the block acknowledgement message indicating whether the received message included errors caused by bursty interference.

19. The computer readable storage medium of claim 18, wherein said determining comprises:
    tracking error and strength metrics for the message; and
    detecting bursty interference based on the error and strength metrics.

20. The computer readable storage medium of claim 19, wherein detecting bursty interference based on the error and strength metrics comprises calculating a ratio between the error and strength metrics and comparing the ratio to a threshold.

21. The computer readable storage medium of claim 19, wherein the error metric comprises a receive error vector magnitude (EVM) and the strength metric comprises a received signal strength indicator (RSSI) minus a noise floor.

22. The computer readable storage medium of claim 18, wherein said determining comprises:
    decoding the message;
    remodulating the decoded message;
    canceling the remodulated message from the original received message;
    performing packet detection on a residual signal resulting from the cancelation; and
    determining the message includes errors caused by bursty interference in response to detecting a packet in the residual signal.

23. The computer readable storage medium of claim 22, the method further comprising generating the block acknowledgment message to include an indicator indicating whether the block acknowledgment message indicates whether the first message included errors caused by bursty interference.

* * * * *